United States Patent [19]
Witt et al.

[11] Patent Number: 5,689,672
[45] Date of Patent: Nov. 18, 1997

[54] PRE-DECODED INSTRUCTION CACHE AND METHOD THEREFOR PARTICULARLY SUITABLE FOR VARIABLE BYTE-LENGTH INSTRUCTIONS

[75] Inventors: David B. Witt; Michael D. Goddard, both of Austin, Tex.

[73] Assignee: Advanced Micro Devices, Inc., Sunnyvale, Calif.

[21] Appl. No.: 145,905

[22] Filed: Oct. 29, 1993

[51] Int. Cl.$^6$ .............................. G06F 9/30; G06F 9/38; G06F 12/00
[52] U.S. Cl. .................. 395/329; 395/383; 395/445; 395/800; 364/232.23; 364/243.41; 364/943.42; 364/259.8; 364/262.4; 364/262.8; 364/262.81; 364/263.1; 364/DIG. 1
[58] Field of Search ......................... 395/375, 800, 395/425, 456, 472

[56] References Cited

U.S. PATENT DOCUMENTS

| | | | |
|---|---|---|---|
| 3,781,808 | 12/1973 | Ahearn et al. | 340/172.5 |
| 4,044,338 | 8/1977 | Wolf | 364/900 |
| 4,155,119 | 5/1979 | DeWard et al. | |
| 4,161,784 | 7/1979 | Cushing et al. | 364/748 |
| 4,179,737 | 12/1979 | Kim et al. | |
| 4,384,343 | 5/1983 | Morganti et al. | |
| 4,453,212 | 6/1984 | Gaither et al. | |
| 4,502,111 | 2/1985 | Riffe et al. | |

(List continued on next page.)

FOREIGN PATENT DOCUMENTS

| | | |
|---|---|---|
| 0 170 525 | 5/1986 | European Pat. Off. |
| 0 380 854 | 8/1990 | European Pat. Off. |
| 0 454 984 | 6/1991 | European Pat. Off. |
| 0 454 985 | 6/1991 | European Pat. Off. |
| 2 263 985 | 8/1993 | United Kingdom . |
| 2 263 987 | 8/1993 | United Kingdom . |
| 2 281 422 | 3/1995 | United Kingdom . |
| 93/20507 | 10/1993 | WIPO . |

OTHER PUBLICATIONS

Tom R. Halfhill, "AMD K6 Takes on Intel P6", *Byte Magagine*, Jan. 1996, pp. 67–68, 70, and 72.

Toyohiko Yoshida, et al., "The Approach to Multiple Instruction Execution in the GMICRO/400 Processor", ©1991, pp. 185–195.

Michael, Slater, "AMD's K5 Designed to Outrun Pentium", *Microprocessor Report*, Oct. 24, 1994, pp. 1,6–11.

(List continued on next page.)

*Primary Examiner*—Kevin J. Teska
*Assistant Examiner*—Ayni Mohamed
*Attorney, Agent, or Firm*—Skjerven, Morrill, MacPherson, Franklin & Friel, LLP; Andrew C. Graham

[57] ABSTRACT

An instruction cache for a superscalar processor having a variable byte-length instruction format, such as the X86 format, is organized as a 16K byte 4-way set-associative cache. An instruction store array is organized as 1024 blocks of 16 predecoded instruction bytes. The instruction bytes are prefetched and predecoded to facilitate the subsequent parallel decoding and mapping of up to four instructions into a sequence of one or more internal RISC-like operations (ROPs), and the parallel dispatch of up to 4 ROPs by an instruction decoder. Predecode bits are assigned to each instruction byte and are stored with the corresponding instruction byte in the instruction store array. The predecode bits include bits for identifying the starting, ending, and opcode bytes, and for specifying the number of ROPs that an instruction maps into. An address tag array is dual-ported and contains 1024 entries, each composed of a 20-bit address tag, a single valid bit for the entire block, and 16 individual byte-valid bits, one for each of the 16 corresponding instruction bytes within the instruction store array. A successor array is dual-ported and contains 1024 entries, each composed of a 14-bit successor index, a successor valid bit which indicates that the successor index stored in the successor array should be used to access the instruction store array or that no branch is predicted taken within the instruction block, and a block branch index which indicates the byte location within the current instruction block of the last instruction byte predicted to be executed.

38 Claims, 24 Drawing Sheets

U.S. PATENT DOCUMENTS

| | | |
|---|---|---|
| 4,736,288 | 4/1988 | Shintani et al. . |
| 4,807,115 | 2/1989 | Torng . |
| 4,858,105 | 8/1989 | Kuriyama et al. . |
| 4,926,322 | 5/1990 | Stimac et al. . |
| 4,928,223 | 5/1990 | Dao et al. . |
| 4,992,934 | 2/1991 | Portanova et al. . |
| 5,056,006 | 10/1991 | Acharya et al. ............ 395/425 |
| 5,129,067 | 7/1992 | Johnson ...................... 395/385 |
| 5,131,086 | 7/1992 | Circello et al. .............. 395/375 |
| 5,136,697 | 8/1992 | Johnson ...................... 395/375 |
| 5,155,816 | 10/1992 | Kohn ........................... 395/375 |
| 5,155,820 | 10/1992 | Gibson ........................ 395/375 |
| 5,185,868 | 2/1993 | Tran ............................. 395/375 |
| 5,222,230 | 6/1993 | Gill et al. .................... 395/550 |
| 5,226,126 | 7/1993 | McFarland et al. ......... 395/375 |
| 5,226,130 | 7/1993 | Favor et al. ................. 395/375 |
| 5,233,694 | 8/1993 | Hotta et al. .................. 395/375 |
| 5,233,696 | 8/1993 | Suzuki ......................... 395/375 |
| 5,247,644 | 9/1993 | Johnson et al. ............. 395/425 |
| 5,251,306 | 10/1993 | Tran ............................. 395/375 |
| 5,454,117 | 9/1995 | Puziol et al. ................ 395/800 |

OTHER PUBLICATIONS

Brian Case, "AMD Unveils First Superscalar 29K Core", Microprocessor Report, Oct. 24, 1994, pp. 23–26.

U.S. Patent Application Ser. No. 07/929,770 filed Apr. 12, 1992 entitled "Instruction Decoder and Superscalar Processor Utilizing Same", David B. Witte and William M. Johnson —copy supplied at application filing.

Mike Johnson, "Superscalar Microprocessor Design", (Prentice Hall series innovative technology), 1991.

H.R. Brandt and P.M. Gannon, "High Speed Buffer with Dual Directories: IBM Technical Disclosure Bulletin", vol. 26, No. 12, May 1984, pp. 6264–6265.

PRE-DECODED INSTRUCTION CACHE AND METHOD THEREFOR PARTICULARLY SUITABLE FOR VARIABLE BYTE-LENGTH INSTRUCTIONS

BACKGROUND OF THE INVENTION

1. Field of the Invention

The present invention relates to super-scalar processors as would typically be implemented on a single integrated circuit, and more specifically relates to instruction cache arrangements for super-scalar processors incorporating a variable byte-length instruction format.

2. Description of Related Art

The term superscalar describes a computer implementation that improves performance by a concurrent execution of scalar instructions—the type of instructions typically found in general-purpose microprocessors. Because the majority of existing microprocessor applications are targeted toward scalar computation, superscalar microprocessors are the next logical step in the evolution of microprocessors. Using today's semiconductor processing technology, a single processor chip can incorporate high performance techniques that were once applicable only to large-scale scientific processors. However, many of the techniques applied to large scale processors are either inappropriate for scalar computation or too expensive to be applied to microprocessors.

Microprocessors by definition must be implemented on one or a very small number of semiconductor chips. Semiconductor technology provides ever increasing circuit densities and speeds for implementing a microprocessor, but the interconnection with the microprocessor's memory is quite constrained by packaging technology. Though on-chip interconnections are extremely cheap, off-chip connections are very expensive; often the processor's package and pins are more expensive than the processor chip itself. Any technique intended to improve microprocessor performance must take advantage of increasing circuit densities and speeds while remaining within the constraints of packaging, technology and the physical separation between the processor and its memory. At the same time, though increasing circuit densities provide a path to ever more complex designs, the operation of the microprocessor must remain simple and clear enough that users can understand how to use it.

An application program comprises a group of instructions. The processor fetches and executes instructions in some sequence. There are several steps involved in the execution of a single instruction, including fetching the instruction, decoding it, assembling its operands, performing the operations specified by the instruction, and writing the results of the instruction to storage. The execution of instructions is controlled by a periodic clock signal. The period of the clock signal is the processor cycle time.

The time taken by a processor to complete a program is determined by three factors: (1) the number of instructions required to execute the program; (2) the average number of processor cycles required to execute an instruction; and (3) the processor cycle time. Processor performance is improved by reducing the time taken, which dictates reducing one or more of these factors.

An obvious way to increase performance is by overlapping the steps of different instructions, using a technique called pipelining. To pipeline instructions, the various steps of instruction execution are performed by independent units called pipeline stages. Pipeline stages are separated by clocked registers (or latches). The steps of different instructions are executed independently in different pipeline stages. The result of each pipeline stage is communicated to the next pipeline stage via the register between the stages. Pipelining reduces the average number of cycles required to execute an instruction, though not the total amount of time required to execute an instruction, by permitting the processor to handle more than one instruction at a time. This is done without increasing the processor cycle time appreciably. Pipelining typically reduces the average number of cycles per instruction by as much as a factor of three. However, when executing a branch instruction, the pipeline may sometimes stall until the result of the branch operation is known and the correct instruction is fetched for execution. This delay is known as the branch-delay penalty. Increasing the number of pipeline stages also typically increases the branch-delay penalty relative to the average number of cycles per instruction.

During the development of early microprocessors, instructions took a long time to fetch compared to the execution time. This motivated the development of complex instruction, or CISC, processors. (The acronym CISC stands for "Complex Instruction Set Computer") CISC processors were based on the observation that given the available technology the number of cycles per instruction was determined mostly by the number of cycles taken to fetch the instruction. To improve performance, the two principal goals of the CISC architecture were to reduce the number of instructions needed for a given task and to encode these instructions densely. It was acceptable to accomplish these goals by increasing the average number of cycles taken to decode and execute an instruction because using pipelining, the decode and execution cycles could be mostly overlapped with a relatively lengthy instruction fetch. With this set of assumptions, CISC processors evolved densely encoded instructions at the expense of decode and execution time inside the processor. Multiple-cycle instructions reduced the overall number of instructions and thus reduced the overall execution time because they reduced the instruction fetch time.

But in the late 1970's and early 1980's, memory and packaging technology changed rapidly. High pin count packages made possible the design of advanced memory interfaces that no longer had quite the same fetch limitations as applied when CISC processors evolved. Memory densities and speeds increased to the point where high speed local memories called caches could be implemented near the processor. When instructions are fetched more quickly using caches, the performance is limited by the decode and execution time that was previously hidden within the instruction fetch time. The number of instructions does not affect performance as much as the average number of cycles taken to execute an instruction.

The improvement in memory and packaging technology, to the point where instruction fetching did not take much longer than instruction execution, motivated the development of reduced instruction, or RISC, processors. (The acronym RISC stands for "Reduced Instruction Set Computer") To improve performance, the principal goal of a RISC architecture is to reduce the number of cycles taken to execute an instruction, allowing some increase in the total number of instructions. The trade-off between cycles per instruction and the number of instructions is not one to one. Compared to CISC processors, RISC processors typically reduce the number of cycles per instruction by factors of roughly three to five, while they typically increase the number of instructions by thirty to fifty percent.

RISC processors have been characterized by some as a return to the basic rudimentary architectures that were developed very early in the evolution of computers. However, early processors were simple because technology was relatively primitive. RISC processors are simple because simplicity yields better performance. Relative to CISC processors, RISC processors depend heavily on advanced memory technology, advanced packaging technology and advanced compiler technology. Furthermore, RISC processors typically rely very much on auxiliary features such as a large number of general purpose registers, instruction and data caches, and others, that help the compiler reduce the overall instruction count or that reduce the number of cycles per instruction.

A typical RISC processor executes one instruction on every processor cycle and, at first glance, no more improvement seems possible. A superscalar processor reduces the average number of cycles per instruction beyond what is possible in a pipelined scalar RISC processor by allowing concurrent execution of instructions in the same pipeline stage as well as concurrent execution of instructions in different pipeline stages. The term superscalar emphasizes multiple concurrent operations on scalar quantities as distinguished from multiple concurrent operations on vectors or arrays as is common in scientific computing.

Superscalar processors are conceptually simple but there is much more to achieving performance than widening a processor's pipeline. Widening the pipeline makes it possible to execute more than one instruction per cycle but there is no guarantee that any given sequence of instructions can take advantage of this capability. Instructions are not independent of one another but are interrelated; these interrelationships prevent some instructions from occupying the same pipeline stage. Furthermore, the processor's mechanisms for decoding and executing instructions can make a big difference in its ability to discover instructions that can be executed at the same time.

Superscalar techniques largely concern the processor organization independent of the instruction set and other architectural features. Thus, one of the attractions of superscalar techniques is the possibility of developing a processor that is code compatible with an existing architecture. Many superscalar techniques apply equally well to either RISC or CISC architectures. However, because of the regularity of many of the RISC architectures, superscalar techniques have initially been applied to RISC processor designs.

The attributes of the instruction set of a RISC processor that lend themselves to single cycle decoding also lend themselves well to decoding multiple RISC instructions in the same clock cycle. These include a general three operand load/store architecture, instructions having only a few instruction lengths, instructions utilizing only a few addressing modes, instructions which operate on fixed-width registers, and register identifiers in only a few places within the instruction format. Techniques for designing a superscalar RISC processor are described in *Superscalar Microprocessor Design*, by William Michael Johnson, ©1991 by Prentice-Hall, Inc. (a division of Simon & Schuster), Englewood Cliffs, N.J.

In contrast to RISC architectures, CISC architectures were defined at a time when the principal implementation technique was microcode interpretation of the instruction set and when pipelining was considered to be an exotic technique. Design goals were oriented more toward deciding which operations should be combined into instructions than designing operations so that they could be overlapped.

Because of microcode interpretation, almost anything could be done with the definition of the instruction set—and generally just about everything was done. It is difficult to implement a pipelined version of such an architecture, and extremely difficult to implement a superscalar version.

Most CISC processors use a large number of different instruction formats. As an example, several of the various instruction formats of the X86 architecture are shown in FIGS. 1A and 1B. This architecture, first introduced in the i386™ microprocessor, is also the basic architecture of both the i486™ microprocessor and the Pentium™ microprocessor, all available from the Intel Corporation of Santa Clara, Calif. There are many instruction format variations, and individual instructions vary from 1 to 15 bytes long.

Referring to FIG. 1A, the minimum instruction of the X86 architecture consists of a single byte, which usually contains an 8-bit opcode (for example, field 2). For certain instructions, the opcode field can be up to 16 bits long, while for other instructions, the byte containing the opcode field (the "opcode" byte) also contains a register field (see format (b) in FIG. 1A). Operations can be register-to-register, register-to-memory, or memory-to-register (but not memory-to-memory). An optional MODRM field (for example, field 3 in instruction format (d)), which follows the opcode field, contains the register specifier and indicates how the memory addressing should be performed. In some instructions, the MODRM field is also used (in a slightly different format) to select condition flags. Finally, an instruction optionally contains up to a four-byte immediate data field (for example, field 4 in instruction format (h)).

As illustrated in FIG. 1B, the MODRM field itself has a variety of possible formats. The first byte of the MODRM field always contains a ModR/M field (for example, field 5) that specifies which register and addressing mode to use. In the more complex memory-addressing modes, an 8-bit S-I-B field (for example, field 6) specifies how address computation is to be done. Finally, the MODRM field contains an optional displacement or offset field (for example, field 7), for address computation.

The length of the displacement and immediate fields depends on the data-width mode of the instruction, because an instruction can operate on 8-bit, 16-bit, or 32-bit data. The data width is determined primarily by a segment descriptor in the memory management architecture, but the default for the segment can be overridden by a bit in the instruction (the w-bit) or by a prefix byte which toggles the effect of the w-bit.

Prefix bytes can appear before any instruction. A prefix byte changes the interpretation of the instruction: it can, for example, change the memory address or operand size of the instruction, change the default segment used in memory addressing, or indicate that the instruction should be executed with the external bus locked. More than one prefix may be included before an instruction, as each type of prefix byte is independent of the others, which gives rise to the maximum instruction length of 15 bytes (that is, for non-redundant prefixes).

During execution, a processor executing the X86 instruction set must deal with instructions that can be from 8 to 120 bits long. The actual length of the instruction is a complex function of the opcode and other instruction fields, because many fields specify whether or not other fields are present. For example, the ModR/M and S-I-B fields both indicate the presence and length of the displacement (DISP) field, and this can be further modified by a prefix byte which can change the address size. A similar situation exists for the length of the immediate (IMMED) field.

It is hard to see how an X86 processor might be able to quickly locate more than one instruction per cycle. At a minimum, it would seem that an additional pipeline stage would be required to locate these instructions before any decoding could be done, adding to the branch-delay penalty because this extra stage must be flushed on a branch. Marking the instruction bytes to aid in subsequent decoding is not itself a solution to reduce this difficulty because, for example, the processor executing X86 instructions must be able to execute self-modifying code. Furthermore, the same X86 instruction byte stream can be executed with different alignments. For example, a programmer could write a sequence of instructions that branches to a given instruction opcode at certain times, and branches to a prefix byte immediately ahead of the opcode byte of the given instruction at other times. The beginning byte of an instruction is not necessarily fixed, depending on the execution flow.

It has been observed that, in the 8086 processor, many commercial programs execute a limited subset of available 8086 instructions. It is also likely that an X86 processor executes a relatively small portion of its instruction repertoire most of the time. This is the very realization that motivated RISC architectures in the first place. This phenomenon should hold true in the future, even as new applications are developed, because new applications probably are going to be written in high-level languages. Compilers typically generate instructions in a stylized fashion, using a subset of the instructions available in a CISC architecture, because code generators often cannot recognize cases where complex instructions can be used.

The vast majority of X86 instructions that are typically utilized are very simple, such as move, jump, add, and shift. Others are almost inordinately complex. It has been suggested that a superscalar X86 processor would probably have two modes of execution: a slow, serial mode for the very complex instructions and a faster, superscalar mode for the simpler instructions. The slow, serial mode would likely take advantage of some form of microcode, while the faster mode would likely execute in hardware.

The Pentium™ processor achieves some degree of superscalar operation by utilizing two fairly traditional integer pipelines, called the U pipeline and the V pipeline, to support execution of up to two simultaneous instructions. The processor decodes in hardware as many of the most frequently occurring instructions as possible. If two such instructions have no resource conflicts, one instruction may execute within the U pipeline under hardwired control while the other executes within the V pipeline, again under hardwired control. More complex instructions require a microcode routine, which controls both pipelines in attempt to optimize the execution of the complex instruction. Since microcoded routines take over all the execution resources, it is not possible for the Pentium processor to pair microinstructions with regular, X86 instructions. Instruction fetching and dispatch are stalled during the execution of a complex, microcoded instruction. In general, the U and V pipelines simultaneously execute separate instructions only if the instructions they contain are independent. Otherwise, the instruction execution is serialized. Additionally, if the U pipeline contains any kind of branch instruction, the V pipeline is idle.

The Pentium™ processor utilizes separate instruction and data caches. The instruction cache (I-cache) is an 8K two-way set-associative cache using a 32-byte line size. A dedicated ITLB (Instruction Table-Lookaside-Buffer) allows the instruction cache to be physically tagged. The array containing these physical tags are triple-ported: one port is for bus snooping (for supporting cache coherency between multiple processors) while the other two are used for a split fetch capability, which gives the processor the ability to fetch a contiguous block of instruction bytes when the block straddles the boundary between two half-cache lines. Instruction bytes read from the cache are stored within one of four 32-byte prefetch buffers.

Alternatively, it has also been suggested that a superscalar X86 processor would have a faster, RISC-like superscalar mode for the simpler instructions and would likely execute in hardware which follows recent advances in RISC processor design. This technique is based on defining a "RISC core" of instructions that are able to take advantage of even more powerful superscalar techniques, such as register renaming, wider superscalar dispatch, out-of-order instruction issue, and out-of-order instruction completion.

However, fetching and decoding instructions is still a critical bottleneck. It is hard enough to find the instruction boundary of a single X86 instruction and to decode its various fields, but it all the more difficult to do so for up to four X86 instructions, all within a single clock cycle.

SUMMARY OF THE INVENTION

It is an object of the present invention to provide a superscalar processor incorporating a variable byte-length instruction format.

It is a further object of the present invention to provide a processor which uses superscalar techniques to fetch and dispatch up to four X86 instructions per clock cycle.

It is yet a further object of the present invention to provide a processor which uses an instruction cache to achieve bandwidth necessary to fetch and dispatch up to four X86 instructions per clock cycle.

Accordingly, in one embodiment, an instruction cache for a processor of the type having a variable byte-length instruction format includes an array for storing a plurality of instruction blocks, where each of the instruction blocks includes a plurality of instruction bytes and a corresponding plurality of predecode bits for each of the instruction bytes. A first means provides for prefetching a plurality of instruction bytes from an instruction source, and a second means provides for predecoding each of the prefetched instruction bytes to determine each of the corresponding plurality of predecode bits for each prefetched instruction byte. A third means provides for storing the plurality of prefetched instruction bytes and corresponding plurality of predecode bits for each prefetched instruction byte into an instruction block within the array, while a fourth means is provided for delivering a requested stream of instruction bytes and corresponding predecode bits from an instruction block within the array to an instruction decoder of the processor.

Other advantages of the present invention will become more clearly apparent upon a careful reading of the detailed description contained herein.

DETAILED DESCRIPTION OF THE PREFERRED EMBODIMENTS

Figure 1A:
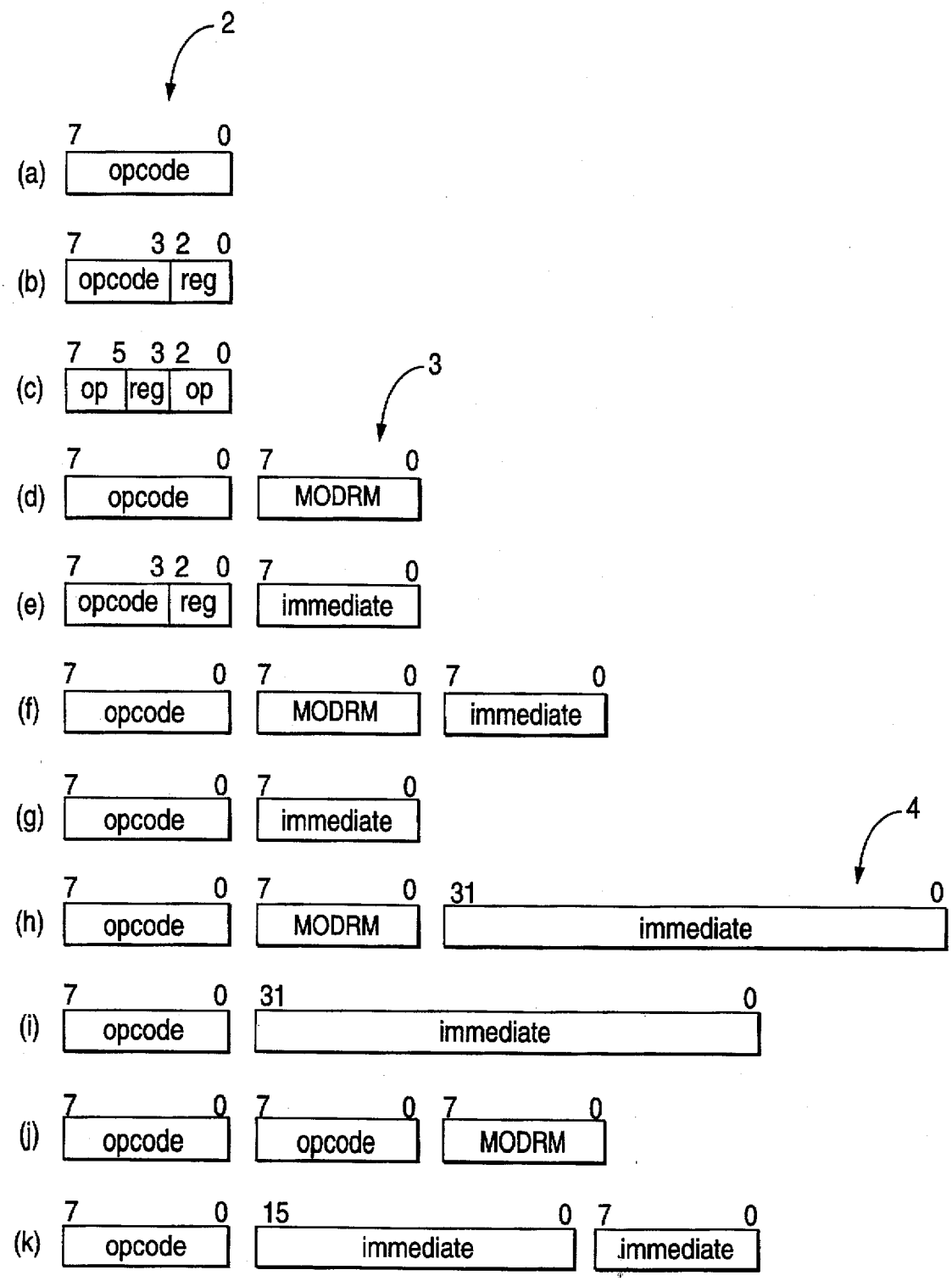
FIG. 1A is a diagram illustrating a sampling of various X86 instruction formats.
Figure 1B:
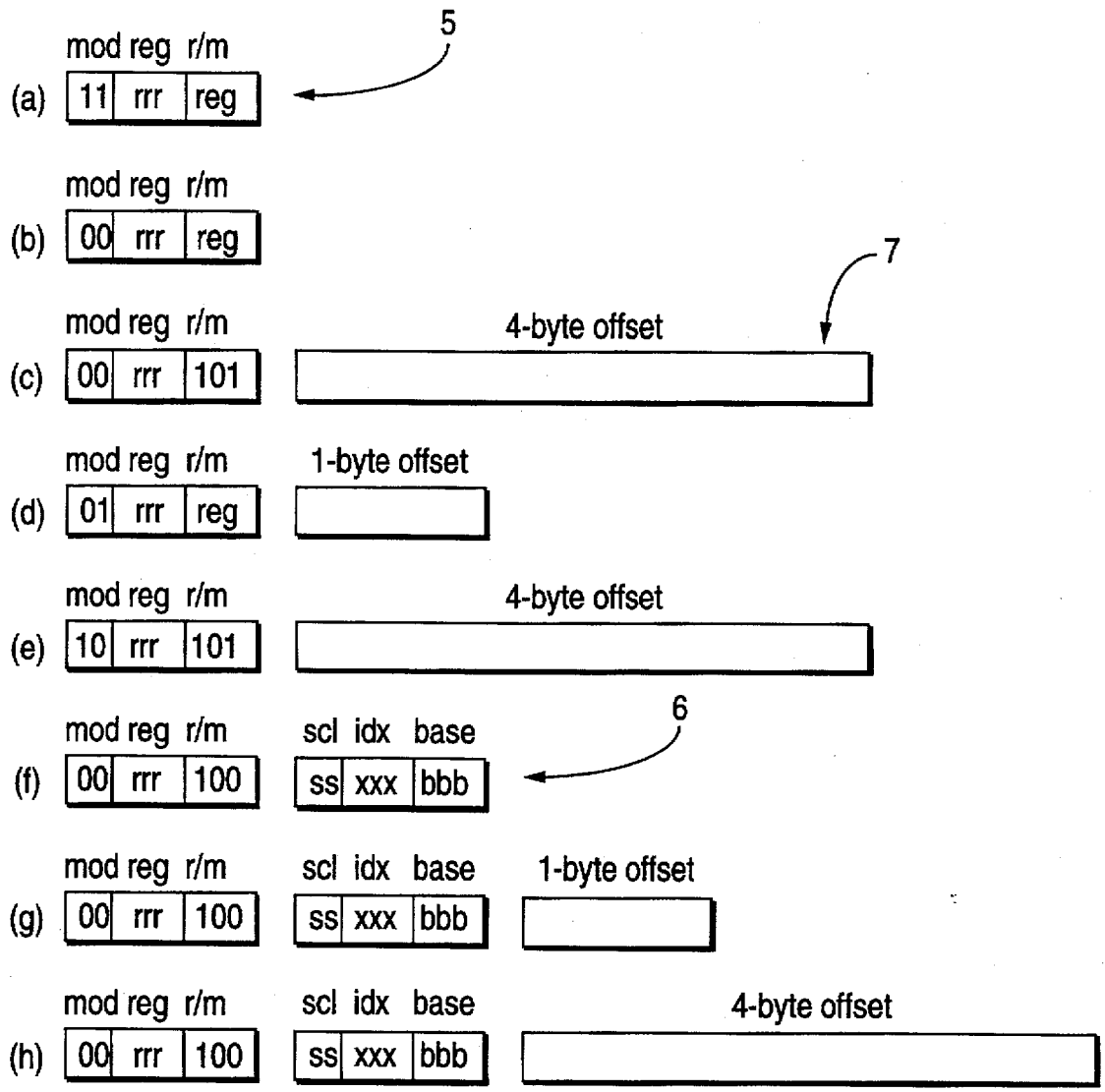
FIG. 1B is a diagram illustrating a variety of X86 MODRM formats as shown in FIG. 1A.
Figure 2:
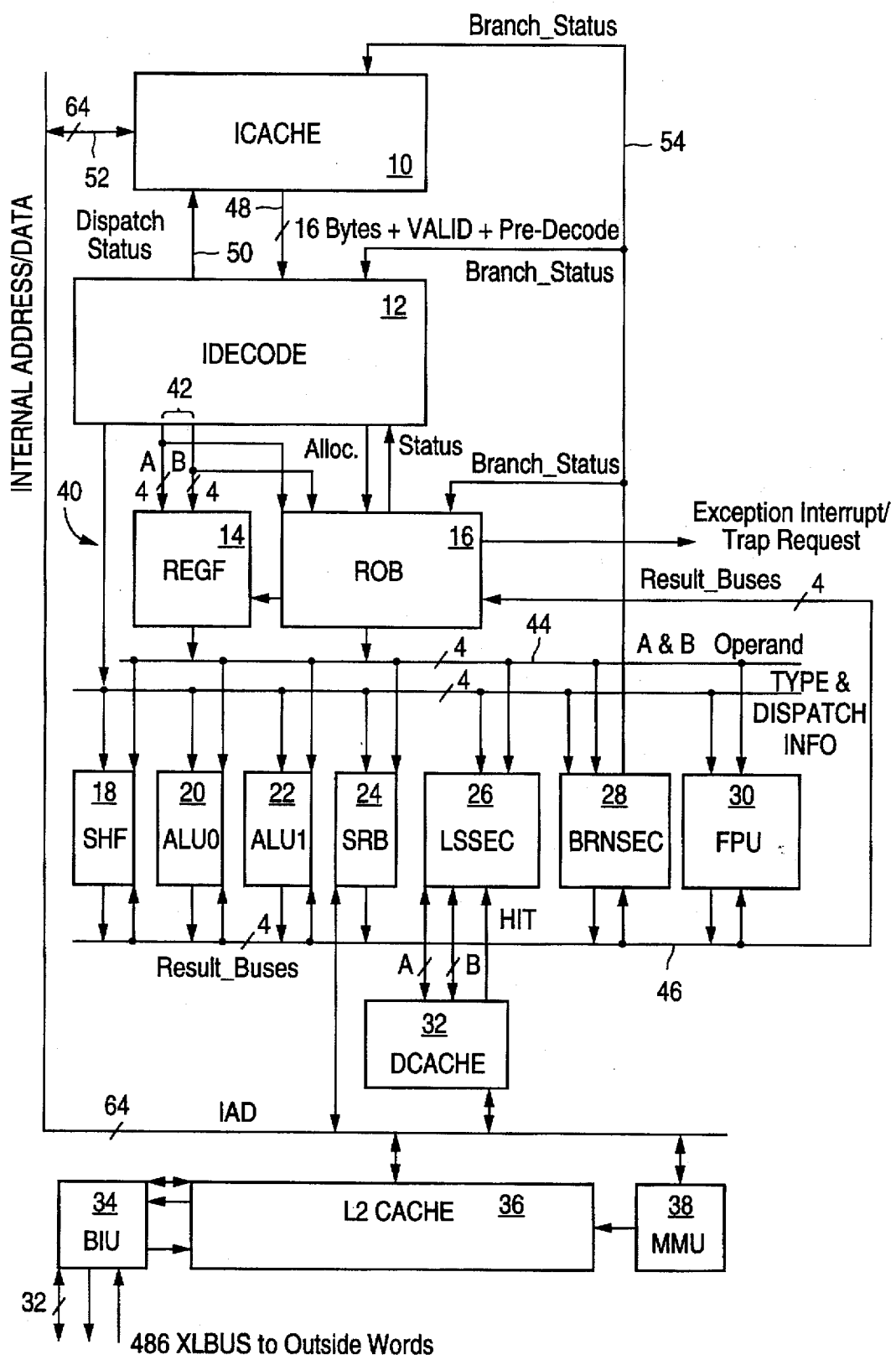
FIG. 2 is a block diagram of a superscalar X86 processor incorporating multiple functional units.

An instruction cache in accordance with the current invention can be best understood in the context of a superscalar X86 processor, as illustrated in FIG. 2. An instruction cache (ICACHE 10) provides a stream of predicted-executed X86 instructions to an instruction decoder (IDECODE 12) using a bus 48. The IDECODE 12 maps each X86 instruction into 1 or more RISC-like operations (ROPs) which are then dispatched, up to four ROPs per clock cycle, to an optimized superscalar RISC core composed of a variety of functional units including, for example, a shift unit (SHF 18), two arithmetic logic units (ALU0 20 and ALU1 22), a special register block (SRB 24), a load/store section (LSSEC 26), a branch section (BRNSEC 28), and a floating point unit (FPU 30). The IDECODE 12 provides dispatch status on bus 50 back to the ICACHE 10 and generates pointers for the operands required by the various ROPs to a register file (REGF 14) and a reorder buffer (ROB 16), which provide the operands to the functional units. The processor further includes a data cache (DCACHE 32), a second level cache (L2CACHE 36) for both instructions and data, a memory management unit (MMU 38) for both instructions and data, and a bus interface unit (BIU 34). Four sets of ROP dispatch busses 40, A and B pointer busses 42, A and B operand busses 44, and result busses 46 enable the superscalar RISC core to execute up to 4 ROPs within the same clock cycle.

The ROB 16 provides a means for implementing register renaming and is managed as a FIFO. When an instruction is decoded by the IDECODE 12, a corresponding entry is allocated in the ROB 16. The result value computed by the instruction is then written into the allocated entry when the execution of the instruction is completed. The result value is subsequently written into the REGF 14 and the instruction retired if there are no exceptions associated with the instruction and if no speculative branch is pending which affects the instruction. If the instruction is not complete when its associated entry reaches the head of the ROB 16, the advancement of the ROB 16 is halted until the instruction is completed. Additional entries, however, can continue to be allocated. If there is an exception or branch misprediction, the contents of the ROB 16 allocated subsequent to the mispredicted branch instruction are discarded.

The vast majority of X86 instructions that are typically utilized by most compilers are very simple (RISC-like), such as move, jump, add, and shift. In the processor of FIG. 2, many of these X86 instructions are mapped into a sequence of 1, 2, or 3 RISC-like three-operand instructions (ROPs) by the IDECODE 12 and are dispatched into the optimized superscalar RISC core. Reservation stations within each of the functional units afford out-of-order issue and, together with the ROB 16, out-of-order completion. These techniques are known in the art of superscalar RISC processor design. Other X86 instructions are almost inordinately complex. These more complicated instructions are mapped into a routine of 4 or more ROPs (a microcode routine or MROM routine) by the IDECODE 12, and which ROPs are likewise dispatched into the superscalar RISC core, thereby leveraging the same hardware already present in the superscalar RISC core.

Figure 3:
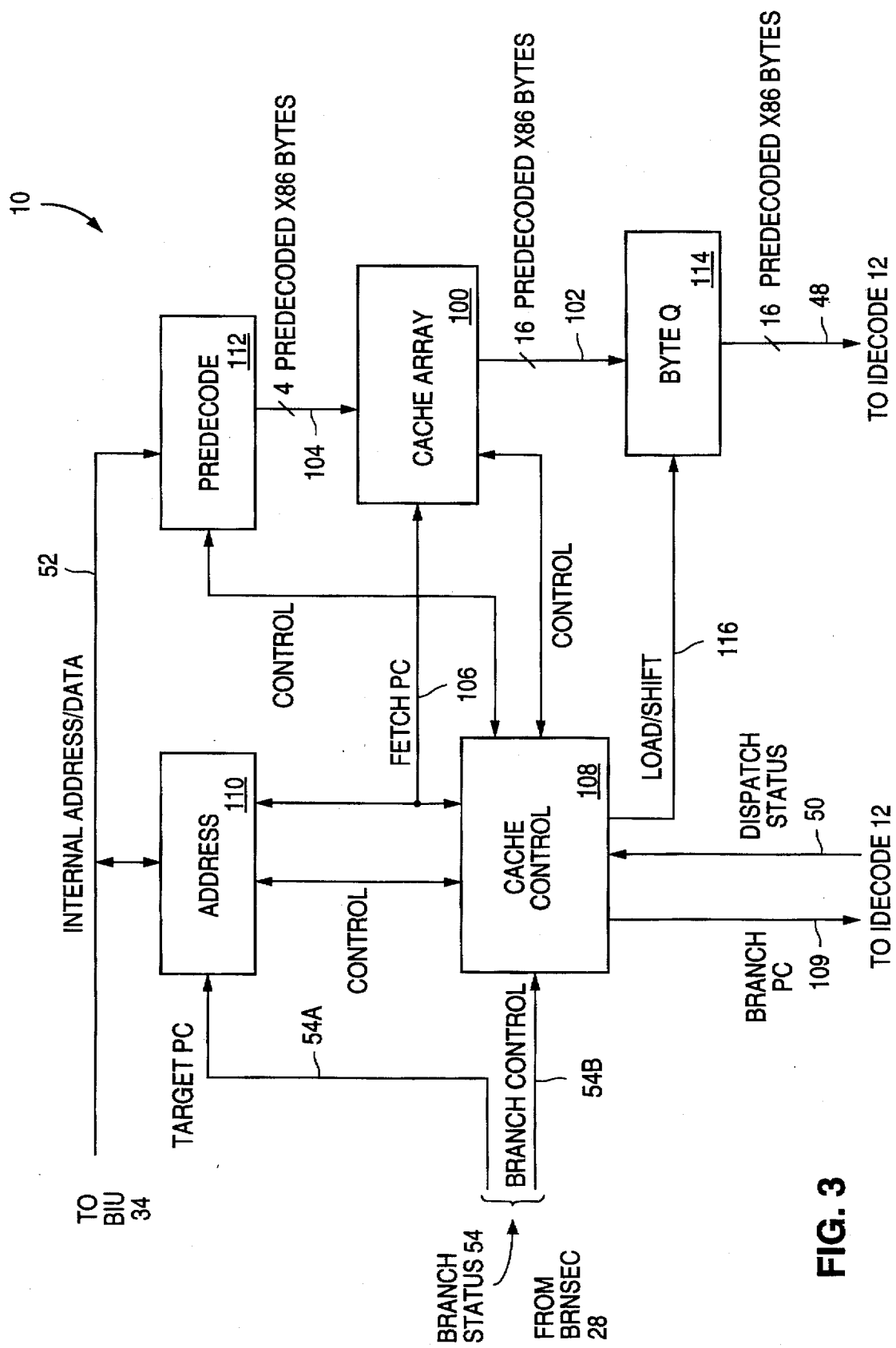
FIG. 3 is a block diagram of the instruction cache illustrated in FIG. 3.

Referring to FIG. 3, the ICACHE 10 includes a cache control 108, which provides control signals to orchestrate the various operations of the ICACHE 10, an address block 110 which generally maintains a fetch program counter (the "Fetch PC") communicated on bus 106 for sequential and non-sequential accesses to the cache array 100, and provides address generation and X86 protection checking associated with pre-fetching instructions from either a secondary cache or external memory, a predecode block 112 which receives pre-fetched X86 instruction bytes via an internal address/data bus 52, assigns predecode bits for each X86 instruction byte, and writes the predecoded X86 instruction bytes using a group of 4 busses 104 into a cache array 100, and a queue of predicted-executed instruction bytes (a "byte queue", or BYTEQ 114), which buffers predicted-executed instructions from the cache array 100 and presents up to 16 valid predecoded X86 instruction bytes to the IDECODE 12 on a group of 16 busses 48. The Fetch PC is preferably maintained as an X86 linear address, which is discussed more fully in copending, commonly-assigned U.S. patent application Ser. No. 08/146,381 now abandoned, filed on even date herewith, entitled "Linearly Addressable Microprocessor Cache", naming David B. Witt as inventor, currently pending as continuation application Ser. No. 08/506,509 filed on Jul. 24, 1995 which is incorporated herein by reference in its entirety.

In operation, the ICACHE 10 pre-decodes the X86 instruction bytes when initially prefetched to facilitate the parallel decoding and mapping of up to four X86 instructions into ROPs, and the parallel dispatch of up to 4 ROPs by the IDECODE 12, all within the same clock cycle. A variety of advantageous configurations are possible for the predecode bits. For example, a group of 5 predecode bits may describe an associated X86 instruction byte as indicated in Table 1, which shows an organization for a 13-bit "predecoded byte".

TABLE 1

| | |
|---|---|
| bit12 | Indicates start byte of X86 instruction. |
| bit11 | Indicates end byte of X86 instruction. |
| bit[10:8] | Indicates the "byte type": |
| | 000- X86 opcode byte; maps to MROM routine. |
| | 001- X86 opcode byte; maps to 1 ROP. |
| | 010- X86 opcode byte; maps to 2 ROPs. |
| | 011- X86 opcode byte; maps to 3 ROPs. |

TABLE 1-continued

|   |   |   |
|---|---|---|
|   | 100- | X86 ModR/M byte. |
|   | 101- | X86 S-I-B byte. |
|   | 110- | X86 DISP/IMM byte. |
|   | 111- | X86 PREFIX byte. |
| bit[7:0] | | "raw" X86 instruction byte. |

Storing an additional 5 predecode bits for each 8-bit X86 instruction byte represents about 60% overhead in the ICACHE compared to the X86 instruction bytes. However, because the X86 instructions are densely encoded and make efficient use of memory (which is, in fact, a large factor in why the X86 instruction format is so complicated) the predecoded instructions bytes are stored reasonably efficiently compared to a traditional 32-bit RISC architecture. On average, an X86 instruction is 3 bytes in length and maps into 1.3 ROPs for the optimized RISC core illustrated in FIG. 2. Therefore, each ROP (which is a RISC-like instruction similar to other traditional RISC processors) requires 30 bits of ICACHE memory, as given by Eq. 1, and which compares favorably to other RISC processors.

$$1 \text{ ROP} = \left(3 \frac{\text{X86 bytes}}{\text{X86 instr}}\right) * 13 \frac{\text{bits}}{\text{byte}} / 1.3 \frac{\text{ROPs}}{\text{X86 instr.}} \quad \text{(Eq. 1)}$$

$$= 30 \text{ bits}$$

Figure 4:
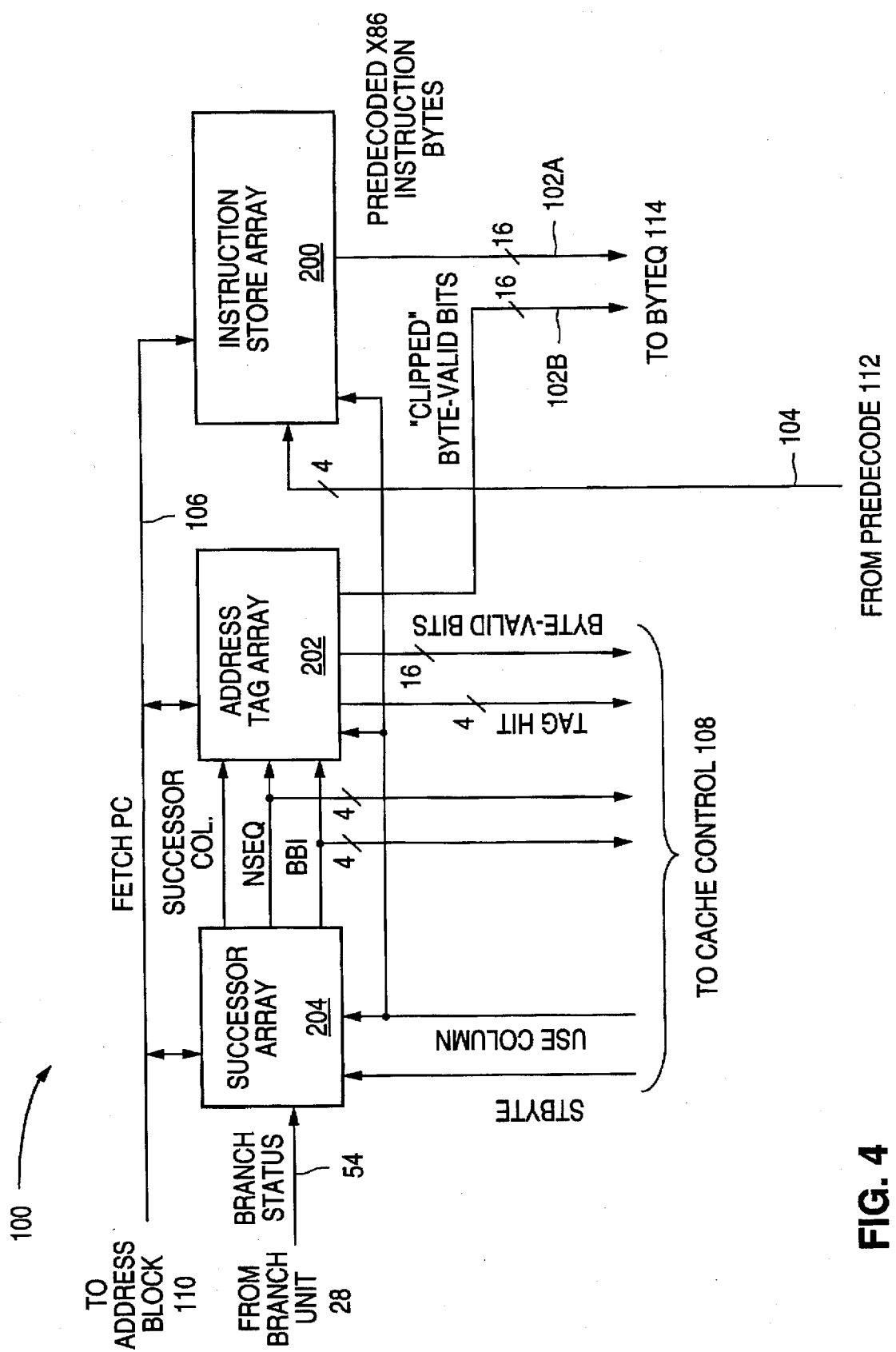
FIG. 4 is a block diagram of the cache array illustrated within the instruction cache of FIG. 3.

Referring now to FIG. 4, the cache array 100 is preferably organized into 3 main arrays: an instruction store array 200, an address tag array 202, and a successor array 204. Each of these three arrays are addressed by the Fetch PC address conveyed on bus 106. As is well known in the art of cache memory design, middle-order bits of the Fetch PC address form a cache index which is used to address these arrays and retrieve an entry from each array, upper-order bits form an address tag which is compared to the tag stored within the retrieved entry from the address tag array 202 for detecting a cache hit, and lowest order bits form an offset into the retrieved entry from the instruction store array 200 to find the byte addressed by the Fetch PC.

In the preferred embodiment, the cache array 100 is organized as a 16K byte 4-way set-associative cache. The instruction store array 200 is organized as 1024 blocks of 16 predecoded X86 instruction bytes. The address tag array 202 is dual-ported and contains 1024 entries, each composed of a 20-bit linear address tag, a single valid bit for the entire block, and 16 individual byte-valid bits, one for each of the 16 corresponding instruction bytes within the instruction store array 200. The successor array 204 is dual-ported and contains 1024 entries, each composed of a 14-bit successor index, a successor valid bit (NSEQ) which indicates when set that the successor index stored in the successor array 204 should be used to access the instruction array 200, and indicates when cleared that no branch is predicted taken within the instruction block, and a block branch index (BBI) which indicates, when the NSEQ is set, the byte location within the current instruction block of the last instruction byte predicted to be executed. The 14-bit successor index is composed of an 8-bit field used as the address index into the cache, a 2-bit field to indicate which column of the 4-way set-associative array contains the successor block of instruction bytes (thus avoiding the time otherwise required to determine which column "hits" at this address), and a 4-bit field which indicates the particular byte within the successor block which is predicted to be the next byte executed.

Figure 5:
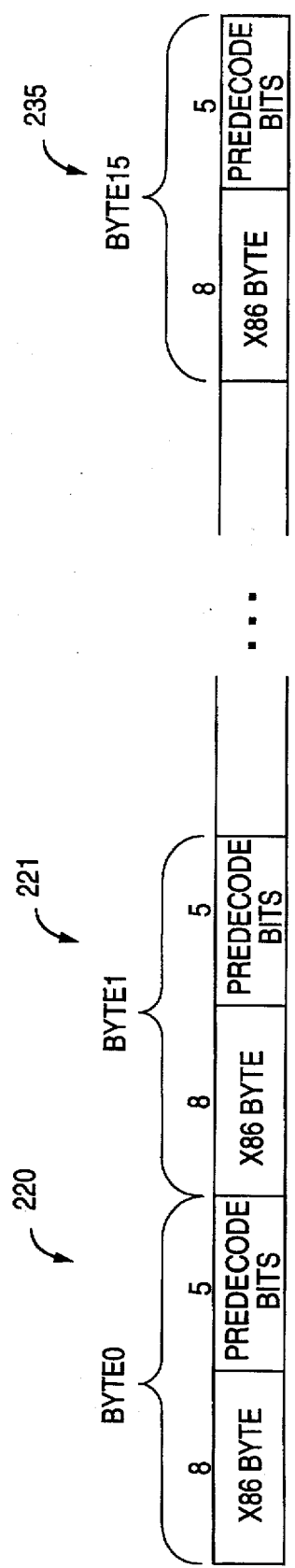
FIG. 5 is a diagram illustrating the various fields of an entry in the instruction store array illustrated in FIG. 4.

FIG. 5 illustrates a preferred organization of an entry in the instruction store array 200. Each entry contains sixteen "predecoded bytes" 220–235, each including an X86 instruction byte (8 bits) and an associated field of 5 predecode bits describing the respective X86 instruction byte. The associated predecode field preferably includes a sub-field for indicating the starting and ending bytes of an X86 instruction, a sub-field for indicating the opcode byte (or a specific one of the opcode bytes if a two-byte opcode) within the various bytes of an X86 instruction, and a subfield indicating the number of ROPs that an X86 instruction maps into, all of which are cached with the respective X86 instruction byte in the instruction store array 200.

A preferred organization for a 13-bit "predecoded byte" is described in Table 2.

TABLE 2

| bit[12] | Indicates start byte of an X86 instruction. |
|---|---|
| bit[11] | Indicates end byte of an X86 instruction. |
| bit[10] | Indicates the X86 opcode byte. |
| bit[9:8] | Indicates # of ROPs instruction maps into: |
| 00- | X86 instruction maps to MROM routine. |
| 01- | X86 instruction maps to 1 ROP. |
| 10- | X86 instruction maps to 2 ROPs. |
| 11- | X86 instruction maps to 3 ROPs. |
| bit[7:0] | "raw" X86 instruction byte. |

Figure 6:
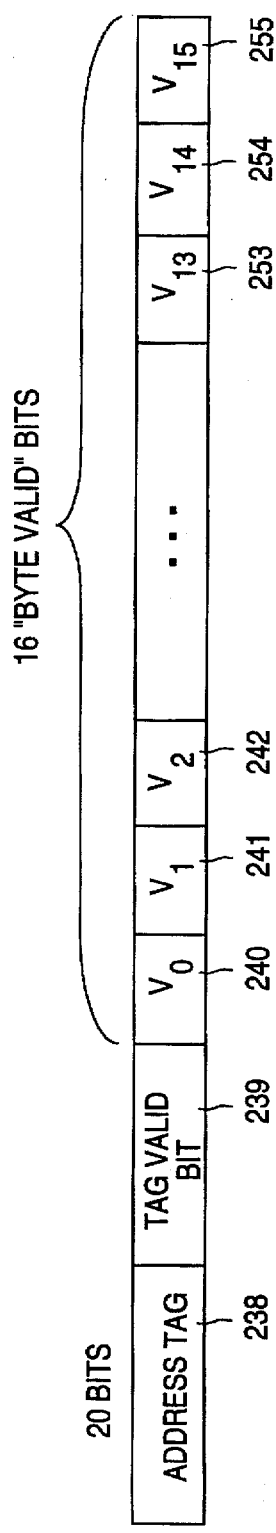
FIG. 6 is a diagram illustrating the various fields of an entry in the tag array illustrated in FIG. 4.

FIG. 6 illustrates a preferred organization of an entry in the address tag array 202. Each entry preferably contains a 20-bit address tag 238 for the block (being the upper 20 bits of the Fetch PC address used to address the cache), a tag valid bit 239, and sixteen "byte-valid" bits 240–255, one respectively for each of the predecoded X86 instruction bytes 220–235 contained in the instruction store array 200. The arrangement for each entry of the address tag array 202 is, of course, dependent upon the size, set associativity, and block size of the cache, as well as the size of the address used. For example, in this preferred embodiment, each column (being a 4-way set associative cache) must have 4K bytes, for a total cache size of 16K bytes. Since the block size is 16 bytes, there must be 256 blocks within each column (to equal 4K bytes). Therefore, the lower 4 bits (bits 3:0) of the address are used to select which byte within a block is the addressed byte, the next 8 bits (bits 11:4) are used to index into each of the 4 columns and to select a block within each column, and the remaining 20 bits (bits 31:12) are used as the address tag 238 and are stored within the address tag array 202 itself to select whether a given column contains the address in question (a cache "hit").

The tag valid bit 239, when asserted, indicates a valid address tag 238. The individual byte-valid bits 240–255, when asserted, each indicate that the corresponding predecoded X86 instruction byte contains a valid X86 instruction byte and valid predecode bits. After a cache miss an entry is allocated at the index location within the address tag array 202 by writing the upper 20 bits of the Fetch PC conveyed on bus 106 into the address tag 238, setting the tag valid bit 239 to indicate a valid address tag, and clearing the 16 byte-valid bits 240–255 to invalidate any instruction bytes remaining in the corresponding entry within the instruction store array 200 from previous activity. As predecoded instruction bytes are written into a previously allocated entry within the instruction store array 200, the respective byte-valid bits are likewise set in the corresponding entry within the address tag array 202.

The successor array 204 is used to support branch prediction, which is vitally important in a superscalar processor to avoid otherwise severe branch delay penalties. A similar branch prediction method is discussed in U.S. Pat.

No. 5,136,697 entitled "System for Reducing Delay for Execution Subsequent to Correctly Predicted Branch Instruction Using Fetch Information Stored With Each Block of Instructions in Cache", naming William M. Johnson as inventor.

Figure 7:
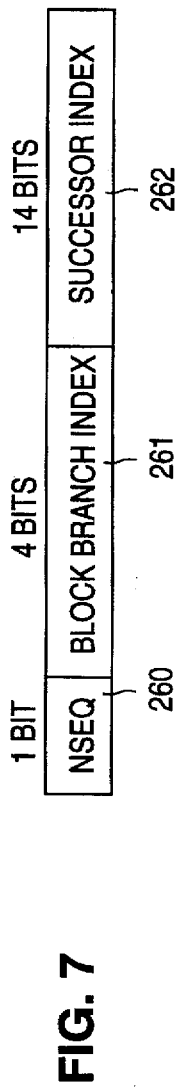
FIG. 7 is a diagram illustrating the various fields of an entry in the successor array illustrated in FIG. 4.

FIG. 7 illustrates a preferred organization of an entry in the successor array 204. Each entry preferably contains a non-sequential bit (NSEQ 260) which, when asserted, indicates a predicted-taken branch within the current block of instructions, a 4-bit block branch index 261 (BBI 261) which indicates, when the NSEQ 260 is asserted, the byte offset within the current block of the last predicted-executed instruction byte, and a 14-bit successor index 262 (SUCC 262) which indicates, when the NSEQ 260 is asserted, the index (8-bits) and the column (2-bits) of the subsequent cache block to be accessed, as well as the byte offset (4-bits) within that block of the next instruction predicted to be executed (the next predicted-executed instruction). The specific size of each entry of the successor array 204 is, of course, dependent upon the size, set associativity, and block size of the cache, as well as the size of the address used. For example, in this preferred embodiment, the 14-bit successor index (SUCC 262) requires 8 bits to select one of 256 blocks, 2-bits to select one of the 4 columns (since 4-way set-associative), and 4-bits to select one byte from a block size of 16 bytes.

The BBI 261 indicates, in other words, the last byte of the predicted-taken branch instruction within the current block, while the SUCC 262 indicates where the next predicted-executed byte of the instruction is located within the cache (the instruction starting at the target address of the speculative branch).

When a branch instruction is initially executed, it is predicted as not-taken and instruction fetching continues sequentially. The location of the branch instruction, nonetheless, is marked in the BYTEQ 114, and if the branch is later determined by the functional unit (BRNSEC 28) to be a taken branch, a branch mis-predict is generated. Speculative instructions logically occurring after the branch instruction (in the not-taken path) are flushed and the ICACHE 10 is redirected by the branch section (BRNSEC 28), which passes the correct target address back to the ICACHE 10 using bus 54, along with a branch MIS_PREDICT signal and a BRANCH_TAKEN signal.

The ICACHE 10 then flushes any remaining instructions in the BYTEQ 114, accesses the instruction stream starting at the target address supplied by the BRNSEC 28 (prefetching from external memory sources, if need be), and starts refilling the BYTEQ 114. The cache line containing the branch instruction just mis-predicted is also modified to indicate a predicted branch by asserting the NSEQ 260 bit, by setting the BBI 261 field to point to the last byte of the branch instruction, and by setting the SUCC 262 field to indicate the location within the ICACHE 10 of the target instruction. The complete address is not stored within the SUCC field, but only the index, column, and offset of the target instruction. The Fetch PC is reconstructed by accessing the cache block using the index and column given by the SUCC 262 field, and by concatenating the address tag (bits 31:12) stored within that block to the index (bits 11:4) and offset (bits 3:0) from the previous SUCC 262 field.

This reconstructed Fetch PC is provided to the IDECODE 12 to enable the IDECODE 12 to maintain a Dispatch PC as instructions are dispatched to the functional units. The IDECODE 12 then matches the branch target address thus supplied with the location of the branch instruction itself, as indicated by a marker bit within the BYTEQ 114 and a corresponding field indicating which cache column holds the branch instruction. The IDECODE 12 then increments bytes off the current decode PC as instruction bytes are dispatched to the functional units, and loads the new branch target PC when the first byte of the branch instruction is loaded into the IDECODE 12 from the BYTEQ 114. This information is also provided to the branch section BRNSEC 28 for actual execution of the branch instruction, and for determining subsequently if the prediction was correct. If so, execution proceeds, but if mis-predicted, the BRNSEC 28 provides the correct target PC resulting from the branch to the ICACHE 10 as previously noted above.

Both the address tag array 202 and the successor array 204 are dual-ported so that updating the branch prediction information in the previous cache block proceeds in parallel with accessing the new cache block. Thus, any time penalty for updating a mis-predicted branch is avoided.

When a predicted-taken branch is mis-predicted, the NSEQ field in the previous cache block (containing the mis-predicted branch) is reset. The other fields, BBI 261 and SUCC 262 are ignored whenever NSEQ 260 is reset, thus indicating a sequential access (in other words, a predicted not-taken branch). A predicted-taken branch which references a negative offset target address, and which is mis-predicted (in other words, is not actually taken) is not updated, but is maintained as a predicted-taken branch. Such is the case of a typical programming loop which indeed "loops" back in the code many times, but only "falls through" the loop once for each execution pass.

Referring again to FIG. 3, the BYTEQ 114 provides a flexible instruction buffer for the IDECODE 12 and contributes to successfully dealing with many of the difficult cache implications arising from a variable byte-length instruction format, such as, for example, the variable byte-length of the X86 instructions, X86 instructions which cross the cache block boundaries, X86 instructions which are partially cached, and X86 instructions which are cached but not predicted executed. The BYTEQ 114 is discussed more fully in co-pending, commonly-assigned U.S. patent application Ser. No. 08/145,902 filed on even date herewith, entitled "Speculative Instruction Queue and Method Therefor Particularly Suitable for Variable Byte-Length Instructions", naming David B. Witt as inventor, currently pending as continuation application Ser. No. 08/311,286 filed on Sep. 23, 1994, and which is incorporated herein by reference in its entirety.

The BYTEQ 114 functions as a specialized FIFO in that the predecoded instruction bytes, received as a block of sixteen predecoded instruction bytes from the cache array 100 on bus 102, are always maintained as oldest to newest. However, the BYTEQ 114 always starts on an X86 instruction boundary, as determined by the predecode bits assigned when initially prefetched, and shifts on complete X86 instruction boundaries. Load/shift signals conveyed from the cache control 108 to the BYTEQ 114 on bus 116 are determined in response to the dispatch status provided by the IDECODE 12 to the cache control 108 on bus 50.

At any given clock cycle, up to sixteen valid predecoded X86 instruction bytes are provided via a group of sixteen multiple-bit busses 48 to the IDECODE 12, which uses the predecode bits to quickly find up to 4 individual X86 instructions (using a START bit and an END bit fields), decode each X86 instruction (using an OPCODE bit field and an ROPLENGTH field), and map the X86 instructions into corresponding ROPs. Up to 4 ROPs are simultaneously dispatched per clock cycle, representing potentially up to 4 X86 instructions. More specific details of IDECODE 12 are discussed in co-pending, commonly-assigned U.S. patent application Ser. No. 08/146,383, filed on even date herewith, entitled "Superscalar Instruction Decoder" naming inventors David B. Witt and Michael D. Goddard, currently pending as continuation application Ser. No. 08/628,389 filed on Apr. 5, 1996.

At a minimum, the BYTEQ 114 must be at least as long as the longest X86 instruction (15 bytes, assuming no redundant prefixes) so as to present at least one entire X86 instruction to the IDECODE 12, and is preferably 16 bytes long. This is somewhat chosen for convenience, being an integer power of 2 and which is the same size as the cache block size, but it does provide a size that, on average, provides enough room to buffer several instructions simultaneously in the BYTEQ 114. Of course, the length could be chosen to be larger for potentially higher performance at the expense of circuit complexity. An X86 instruction is shifted out of the BYTEQ 114 whenever all the ROPs associated with that X86 instruction are dispatched into the RISC core. Dispatch information is conveyed by the IDECODE 12 to the cache control 108 on bus 50, which controls the shifting of the BYTEQ 114 by Load/store signals conveyed on bus 116. If only a portion of the ROPs associated with a given X86 instruction are dispatched in a given cycle, the X86 instruction is not shifted out of the BYTEQ 114. In such a case, if another X86 instruction present in the BYTEQ 114 is fully dispatched, the BYTEQ 114 will shift the partially dispatched X86 instruction to the head of the BYTEQ 114 so that the IDECODE 12 may dispatch the remaining ROPs during the next clock cycle.

Figure 8:
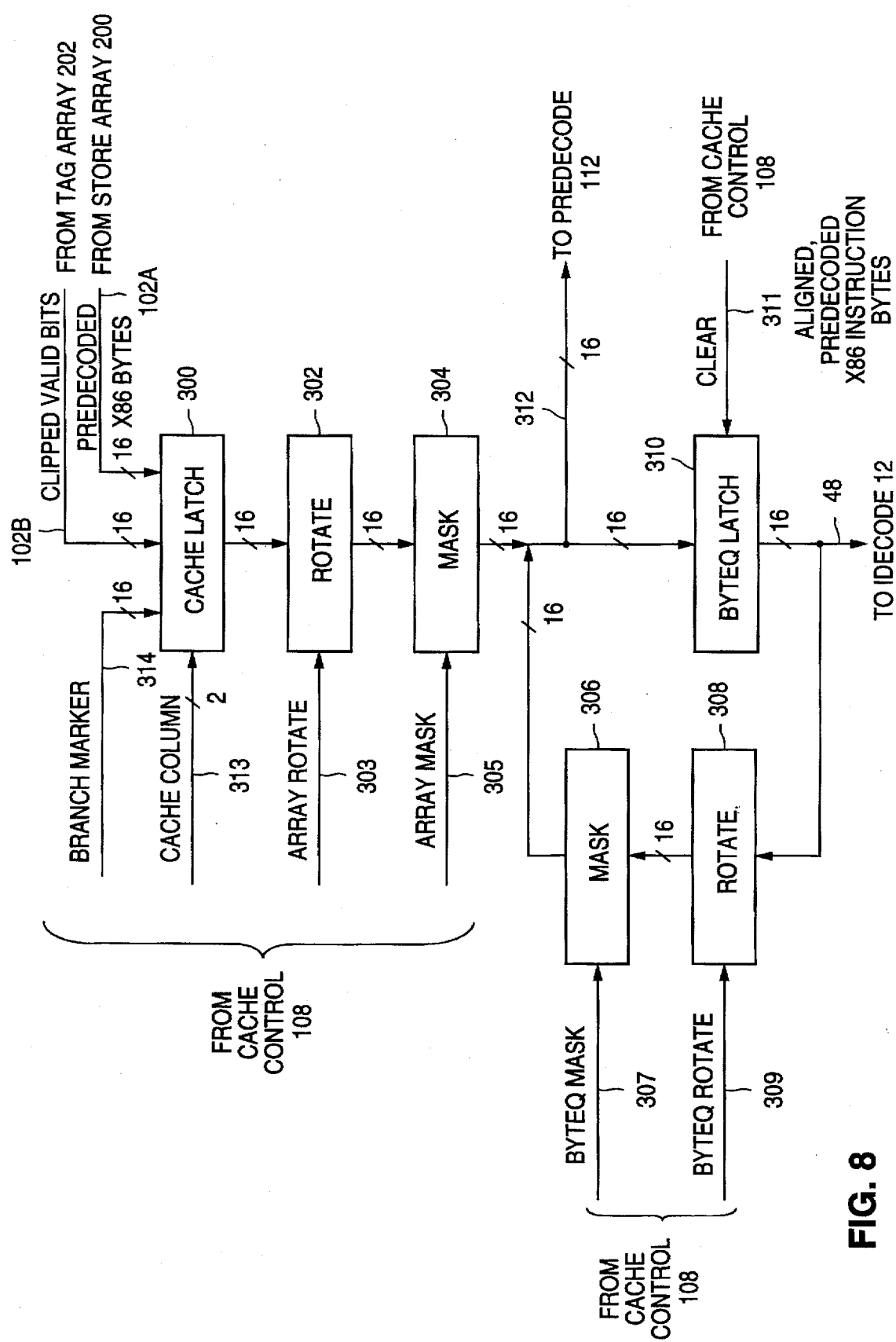
FIG. 8 is a block diagram of the byte queue illustrated within the instruction cache of FIG. 3.

Referring now to FIG. 8, the BYTEQ 114 includes a cache latch 300 which receives sixteen predecoded X86 instruction bytes conveyed on bus 102A from the instruction store array 200, sixteen corresponding "clipped" byte-valid bits conveyed on bus 102B from the address tag array 202, sixteen corresponding branch marker bits conveyed on bus 314 from the cache control 108, and a 2-bit cache column indicator, conveyed on bus 313 from cache control 108, which indicates the column (of the 4-way set-associative cache) which the corresponding instruction bytes are stored within. The cache column indicator is replicated into each of the 16 output positions of the cache latch 300. The "clipped" byte-valid bits are set for only those valid bytes which are predicted executed within a cache block (or cache line), as will be discussed herein. A rotate block 302 receives the outputs from cache latch 300 and, responsive to an array rotate signal conveyed from the cache control 108 on bus 303, rotates the byte positions by an amount to align an indicated byte position into the first position. All 16 byte positions are rotated by the same amount in a recirculating manner. A mask block 304 receives the outputs of each byte position of the rotate block 302 and selectively drives certain byte positions of a bus 312, responsive to an array mask signal conveyed from the cache control 108 on bus 305.

The state of bus 312 is latched by a byteq latch 310, which then provides the predecoded X86 instruction bytes to IDECODE 12 via the sixteen-"predecoded byte" wide bus 48 (For example, a bus 48 conveying 16 bytes of 13 bits each). The byteq 114 further includes a rotate block 308 which also receives the sixteen predecoded X86 instruction bytes conveyed on bus 48 from the byteq latch 310 and, responsive to a byteq rotate signal conveyed from the cache control 108 on bus 309, rotates the byte positions by an amount to align an indicated byte position into the first position. All 16 byte positions are rotated by the same amount in a recirculating manner. A mask block 306 receives the outputs of each byte position of the rotate block 308 and selectively drives certain byte positions of bus 312, responsive to a byteq mask signal conveyed from the cache control 108 on bus 307.

Each bit position (of each byte position) of bus 312 is precharged into, for example, a high state by precharge circuitry not shown. Subsequently, when the mask blocks 304 and 306 are enabled to drive their respective outputs, each bit position of bus 312 is discharged, for example, into a low state by either mask block 304 or mask block 306. The cache control 108 ensures that the array mask on bus 305 and the byteq mask on bus 307 provides for each byte position of bus 312 being driven by either of the mask blocks 304 or 306, but not both. Thus, bus 312 functions as a "wired-or" bus and is used to merge data from two different sources, which is then loaded into the byteq latch 310 during the next clock cycle. Such a technique utilizing a rotate function to shift instruction bytes is possible whenever the block size of the cache is identical to the length of the BYTEQ.

Figure 9:
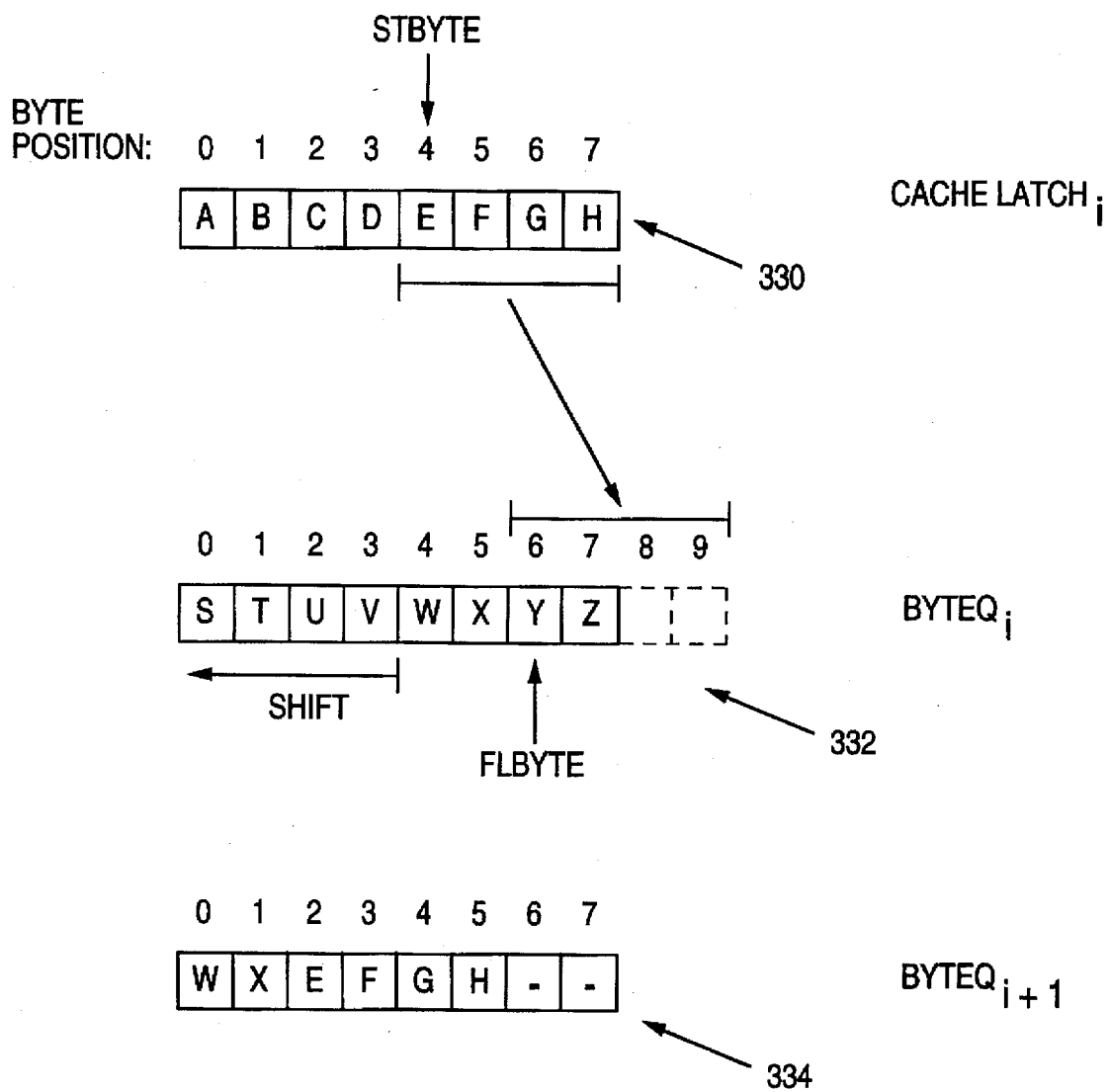
FIG. 9 is a diagram illustrating the conceptual operation of the byte queue illustrated in FIG. 8.

FIG. 9 illustrates a simplified 8-position example of the operation of such a byteq as illustrated in FIG. 8. For clarity, only 8 byte-positions are shown, although the byteq is easily extended to any width. Cache Latch$_i$ (state 330) illustrates the contents of the cache latch 300 during a given clock cycle, and shows bytes A–H loaded in respective byte positions 0–7. Each such byte A, B, C, etc, represents a predecoded X86 instruction byte as would be present in each of the byte positions of cache latch 300. A start byte pointer (STBYTE) is shown as indicating that byte positions 4, 5, 6, and 7 remain to be shifted into the byteq latch 310.

ByteQ$_i$ (state 332) illustrates the contents of the byteq latch 310 during the same clock cycle, and shows bytes S–Z loaded in respective byte positions 0–7. Each such byte S, T, U, etc, represents a predecoded X86 instruction byte as might be present in each of the byte positions of byteq latch 310. A fill byte pointer (FLBYTE) is shown as indicating that byte position 6 is the next available byte position. Also shown in state 332 is a shift amount (SHIFT) corresponding to, for example, instruction bytes for X86 instructions that are completely dispatched during the current clock cycle and which are to be shifted out of the byteq latch 310, resulting in byte W resident at byte position 0.

ByteQ$_{i+1}$ (state 334) illustrates the contents of the byteq latch 310 during the following clock cycle and shows byte W and X shifted into byte positions 0 and 1, respectively, and bytes E, F, G, and H from the cache latch 300 shifted into byte positions 2, 3, 4, and 5, respectively. Byte positions 6 and 7, in this example, are invalid because the available byte positions in the byteq latch 310 exceed the remaining bytes in the cache latch 300. While it appears (for a fixed width of 8 byte positions) that the shift operation of the byteq latch 310 must take place before the new bytes from the cache latch 300 are loaded into the byteq latch 310 (as made apparent by the dotted-line byte positions "8" and "9" in state 332), in fact both operations occur simultaneously.

Figure 10:
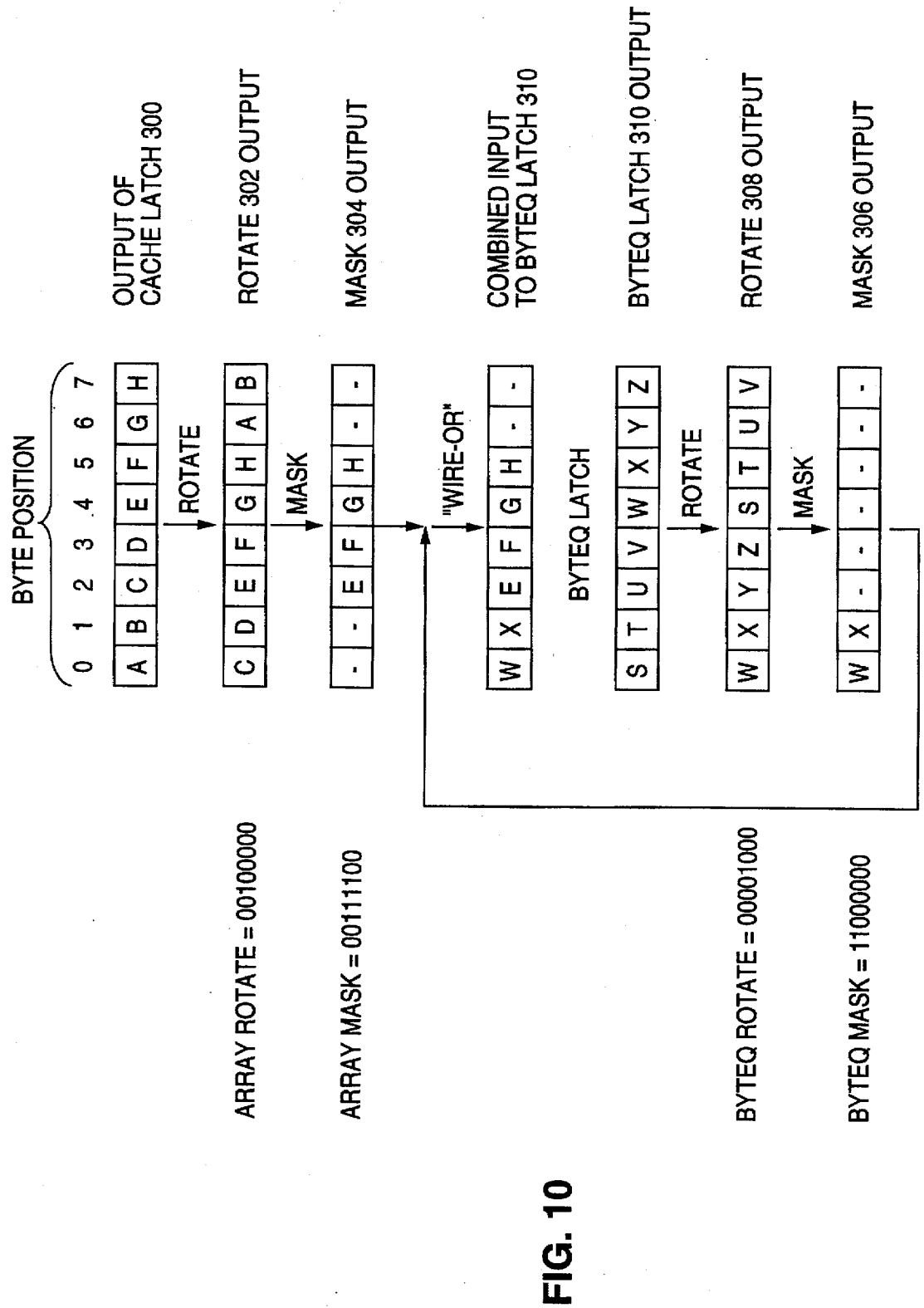
FIG. 10 is a diagram illustrating the operation, for a specific example of instruction bytes, of the byte queue illustrated in FIG. 8.

FIG. 10 shows the outputs of each of the blocks illustrated in FIG. 8 for the example (8-byte) operation shown in FIG. 9, and shows the rotate and mask controls derived from the STBYTE and FLBYTE pointers in this example. As before, bytes A–H are shown resident in respective byte positions 0–7 of the cache latch 300. With the array rotate signal set to "0010 0000", the byte residing in byte position 2 (currently the "C" byte) is rotated into byte position 0, with the other bytes rotated accordingly. The outputs of the rotate block 302 are then provided to the mask block 304. With the array mask signal set to "0011 1100", only byte positions 2–5 (bytes E–H) are driven onto respective byte positions of bus 312. Again as before, bytes S–Z are shown resident in respective byte positions 0–7 of the byteq latch 310. With the byteq rotate signal set to "0000 1000", the byte residing in byte position 4 (currently the "W" byte) is rotated into byte position 0, with the other bytes rotated accordingly. The outputs of the rotate block 308 are then provided to the mask block 306. With the byteq mask signal set to "1100 0000", only byte positions 0–1 (bytes W–X) are driven onto respective byte positions of bus 312. Thus, bytes W, X, E, F, G, and H are latched into byte positions 0–5, respectively, of the byteq latch 310 on the next clock cycle, all in a single load operation. Bytes 6 and 7, indicated by an "–" on the combined input to the byteq latch 310, are not driven in this example by either mask block. The polarity of the byte-valid bits is preferably chosen such that the precharged state remaining on the byte-valid bit in these two byte positions indicates to the IDECODE 12 an invalid instruction byte in these byte positions.

Figure 11:
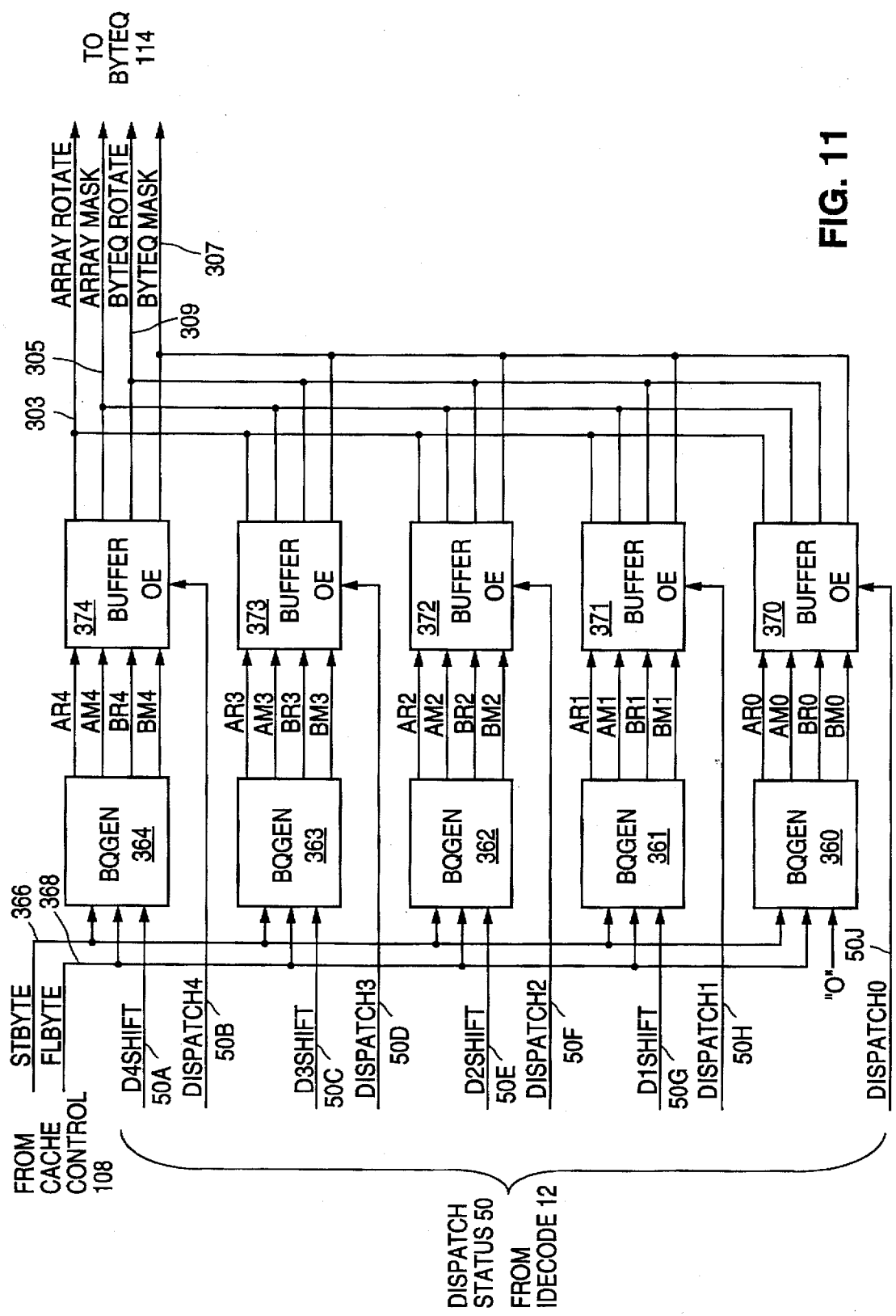
FIG. 11 is a block diagram of a portion of the byte queue control logic within the cache control block illustrated in FIG. 3.

FIG. 11 shows a portion of the cache control 108 which includes five different byteq control generation circuits (BQGEN 360–364), each driven by common STBYTE and FLBYTE pointers conveyed on busses 366 and 368, respectively. Generally, five versions of each of the four signals necessary to shift/load the byteq 114 are generated in parallel during instruction decode, each corresponding to the respective anticipated dispatch of 0, 1, 2, 3, or 4 ROPs by the IDECODE 12 during a given clock cycle. When the actual number of dispatched ROPs is known, a dispatch signal enables one of five buffers which drives one such version of these four signals onto respective busses 303, 305, 307, and 309.

For example, BQGEN 364 receives a D4SHIFT signal conveyed on bus 50A from the IDECODE 12 which indicates, for the anticipated case of all 4 ROPs being dispatched by the IDECODE 12, how many bytes the byteq 114 should be shifted for the next cycle. The IDECODE 12 generates this D4SHIFT based upon the mapping of each ROP back into the corresponding X86 instruction, and the byte-length of each X86 instruction in the byteq 114 (based upon the start byte and end byte fields in the predecoded bits). Consequently, the D4SHIFT generated by the IDECODE 12 indicates, in the case that all 4 ROPs are dispatched, the number of bytes the BYTEQ 114 should shift to completely shift out of the BYTEQ 114 all X86 instructions whose ROPs are fully dispatched. In response to the D4SHIFT signal conveyed on bus 50A, the STBYTE pointer conveyed on bus 366, and the FLBYTE pointer conveyed on bus 368, the BQGEN 364 generates four control signals, AR4, AM4, BR4, and BM4, which are then driven, responsive to a DISPATCH4 signal conveyed on bus 50B from the IDECODE 12, by a buffer 374 (having three-state outputs) to become the respective signals ARRAY ROTATE, ARRAY MASK, BYTEQ ROTATE, and BYTEQ MASK conveyed on respective busses 303, 305, 309, and 307 to the BYTEQ 114.

In a similar fashion, BQGEN 360, BQGEN 361, BQGEN 362, and BQGEN 363 receive a respective signal "0", D1SHIFT, D2SHIFT, and D3SHIFT corresponding to the respective anticipated dispatch of 0, 1, 2, and 3 ROPs by the IDECODE 12 during the current clock cycle, and generate appropriate rotate and mask signals, one set of which is gated by respective buffers 370, 371, 372, and 373 onto busses 303, 305, 309, and 307 in response to respective signals DISPATCH0, DISPATCH1, DISPATCH2, AND DISPATCH3 received from the IDECODE 12 when the actual number of dispatched ROPs is known. The BQGEN 360 generates all four BYTEQ 114 control signals because, even in the case of no ROPs being dispatched (DISPATCH0 asserted) and consequently when the BYTEQ 114 is not shifted, additional predecoded instruction bytes from the cache array 100 may continue to fill into any available byte positions in the BYTEQ 114, as indicated by the STBYTE and FLBYTE pointers.

Figure 12:
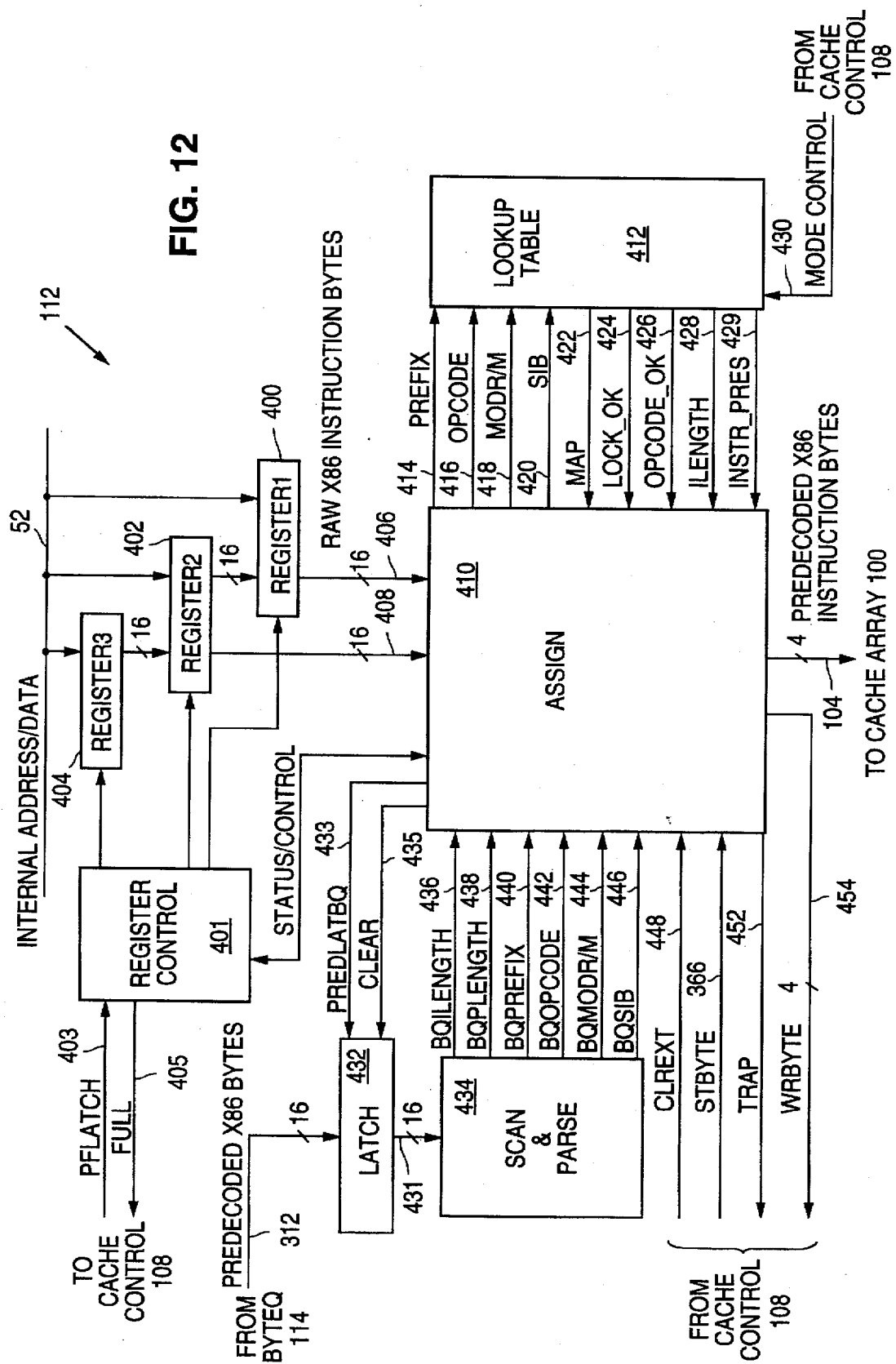
FIG. 12 is a block diagram of the predecode block illustrated within the instruction cache of FIG. 3.

Referring now to FIG. 12, the PREDECODE 112 includes registers 400, 402, and 404 for receiving prefetched instruction bytes conveyed on internal address/data bus 52 from an instruction source (which may include a secondary cache or external memory). A request to pre-fetch instructions is received from the cache control 108 upon a cache miss in the cache array 100. A register control 401 receives a prefetch latch (PFLATCH) signal conveyed on bus 403 from the cache control 108. This PFLATCH signal is asserted to indicate that the next available register 400, 402, or 404 should latch the instruction bytes present on the internal address/data bus 52. The register control 401 generates control signals for registers 400, 402, and 404 accordingly, and also asserts a FULL signal conveyed on bus 405 back to the cache control 108 when all three registers are full.

As many as 32 bytes are conveyed on busses 406 and 408 to an assign block 410 which scans the instruction bytes starting at the byte indicated by the STBYTE pointer conveyed on bus 366 from the cache control 108 and which corresponds to either the prefetch address or to the byte immediately following the last complete instruction prefetched. This first byte must be either a prefix byte or an opcode byte, and is marked as a starting byte. If one or more prefix bytes are encountered before the opcode byte, each prefix byte encountered is preferably recoded and also includes any prefix information from previously encountered prefix bytes. Thus, the last prefix byte before the opcode byte becomes a consolidated prefix byte containing prefix information from all previous prefix bytes encountered in the "raw" X86 instruction. The preferred encoding for the consolidated prefix byte (as well as recoded prefix bytes) is presented in Table 3. Specific descriptions of the various prefixes for the X86 instruction set are found in the i486™ *Microprocessor Programmer's Reference Manual*, available from the Intel Corporation of Santa Clara, Calif.

TABLE 3

| | | |
|---|---|---|
| 7:5 | 000 | no segment prefix |
| | 001 | CS segment override prefix |
| | 010 | DS segment override prefix |
| | 011 | ES segment override prefix |
| | 100 | FS segment override prefix |
| | 101 | GS segment override prefix |
| | 110 | SS segment override prefix |
| | 111 | reserved |
| 4:3 | 00 | no repeat or lock prefix |
| | 01 | LOCK prefix |
| | 10 | REPNE prefix |
| | 11 | REP/REPE prefix |
| 2 | 0 | no operand size prefix |
| | 1 | operand size prefix |
| 1 | 0 | no address size prefix |
| | 1 | address size prefix |
| 0 | 0 | no two-byte opcode prefix |
| | 1 | two-byte opcode prefix |

The opcode byte is marked, for example, by setting bit10 in the field of predecode bits, according to the configuration described in Table 2. The consolidated prefix byte is the byte immediately preceding the opcode byte, unless the opcode byte is also marked as the starting byte, which implies no prefix is present. The byte immediately following the opcode byte is tentatively assumed to be an X86 ModR/M byte, with the next byte tentatively assumed to be an X86 S-I-B byte. The four instruction fields PREFIX (being the consolidated prefix byte), OPCODE, ModR/M, and S-I-B are then conveyed on respective busses 414, 416, 418, and 420 to a lookup table 412, which is preferably implemented as a PLA. Mode control information is conveyed on bus 430 to the lookup table 412, which returns values for MAP, LOCK_OK, OPCODE_OK, ILENGTH, and INSTR_PRES conveyed on respective busses 422, 424, 426, 428, and 429 back to the assign block 410.

The MAP value indicates the number of ROPs the current instruction maps into, which is a function of the specific operands as specified by any ModR/M and/or S-I-B byte, the mode of the processor, and the presence of any prefix bytes, among others. The P0 and P1 bits (bits 8 and 9 of Table 2) within the predecode field for the bytes of this instruction are set appropriately for the number of ROPs specified by the MAP value. The value LOCK_OK indicates whether a lock prefix is valid for the particular instruction. An illegal instruction trap is generated when a invalid lock prefix precedes an opcode by asserting the TRAP signal conveyed on bus 452 to the cache control 108. The value OPCODE_OK indicates the validity of the opcode field, which is also used to generate an illegal instruction trap when an illegal opcode is encountered. The value INSTR_PRES conveyed on bus 429 indicates the presence of enough instruction bytes to make proper determination of the other values communicated by lookup table 412. The value ILENGTH indicates the byte-length of the instruction, and is used to set the ending byte bit in the predecode field accordingly. With the end of the instruction found and all predecode bits assigned, the predecoded instruction bytes are conveyed, up to 4 bytes at a time, on bus 104 to the cache array 100. A WRBYTE signal is conveyed on bus 454 to the cache control 108 and indicates which respective predecoded bytes conveyed on bus 104 are valid and should be written into the cache array 100.

In a variable byte-length instruction format such as the X86 format, a single instruction may frequently cross cache line boundaries when written into the cache array 100. In other words, the first portion of the instruction is stored within a given cache line (or cache block) when initially cached and the remaining portion of the instruction is stored within the following cache line. Subsequent memory references may cause the cache line containing the remaining portion of the instruction to be allocated to a different memory location and written with unrelated instruction bytes. When the processor executes the given instruction again, the cache access will "miss" when attempting to access the second cache line. Such a partially cached instruction is detected by the cache control 108, which allocates a new cache line for the trailing bytes of the instruction and issues a prefetch of the instruction bytes, which are brought into the PREDECODE block 112 as before.

Rather than prefetching the cache line containing the beginning bytes of the partially cached instruction (which are already present in the cache array 100 and in the byteq 114), the beginning bytes of the instruction are instead loaded, upon the assertion of a PREDLATBQ signal conveyed on bus 433, from the byteq 114 directly into a latch 432 via bus 312. These sixteen instruction bytes are conveyed on bus 431 to a scan and parse block 434 which locates the incomplete instruction within the 16 bytes from the byteq 114. Up to four byte fields within the partial instruction and two values generated from the partial instruction are conveyed to the assign block 410 to provide a starting basis for the assignment of the predecode bits for the remainder of the instruction bytes. A BQILENGTH value, conveyed on bus 436, indicates the number of instruction bytes, beginning with the opcode byte, resident in the earlier cache line. A BQPLENGTH value, conveyed on bus 438, indicates the number of prefix bytes within the cache line occurring before the opcode byte. The consolidated prefix byte (BQPREFIX), the opcode byte (BQOPCODE), the ModR/M byte (BQMODR/M), and the S-I-B byte (BQSIB), if found within the current cache line, are conveyed on respective busses 440, 442, 444, and 446 to the assign block 410, which assigns predecode bits to the remaining bytes prefetched from memory and writes the remaining bytes into the cache array 100 as before. A CLEAR signal conveyed on bus 435 from the assign block 410 clears the latch 432 upon the successful writing of all instruction bytes for the instruction.

A CLREXT signal conveyed from the cache control 108 on bus 448 indicates a new prefetch address is forthcoming, and to clear the registers 400, 402, and 404 and discontinue predecoding of the former prefetch instruction stream.

Figure 13:
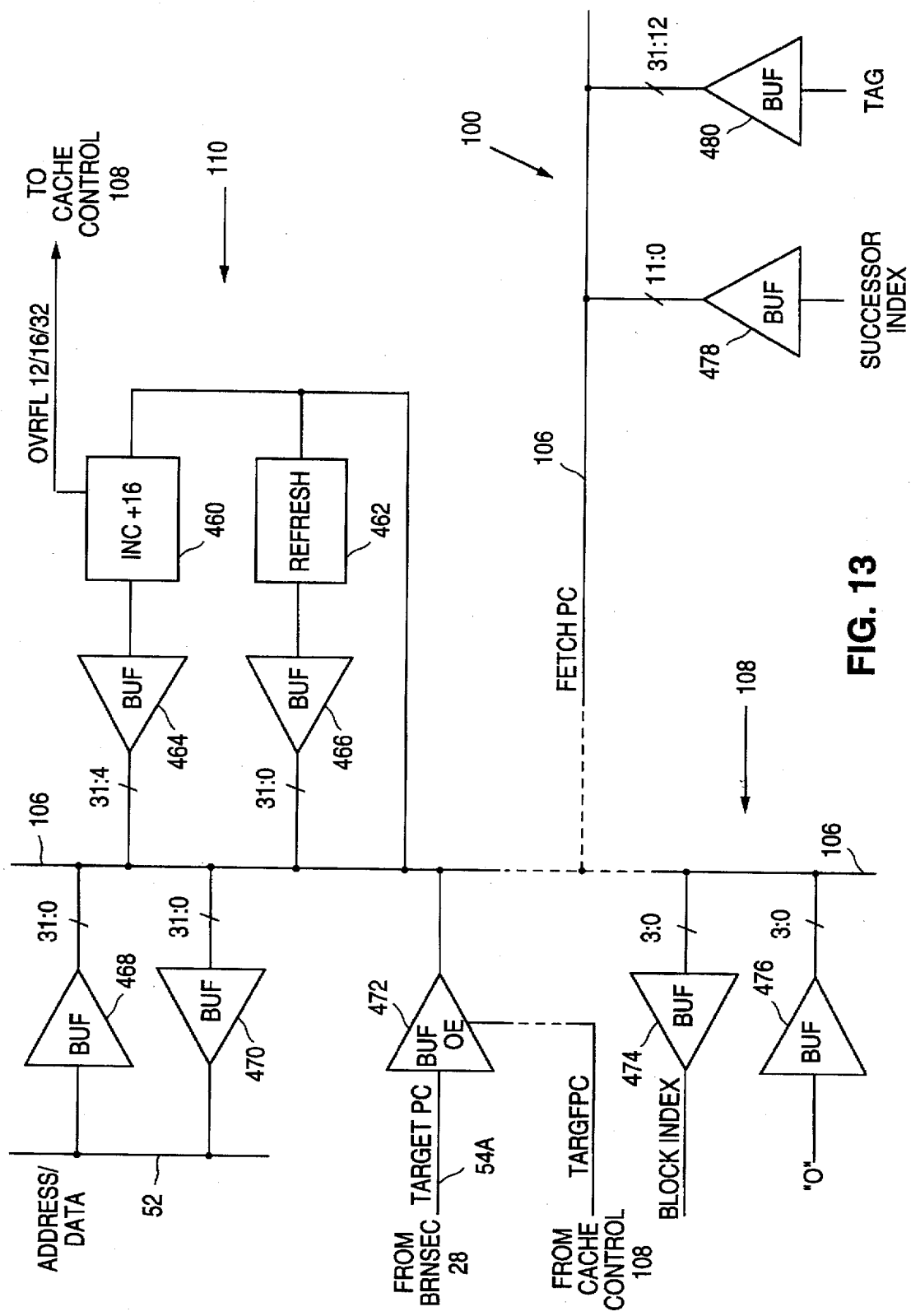
FIG. 13 is a block diagram of the address block illustrated within the instruction cache of FIG. 3.

FIG. 13 illustrates portions of each of the address block 110, the cache control 108, and the cache array 100 which together generally maintain and redirect the Fetch PC conveyed on bus 106. Because this processor utilizes branch prediction to accomplish speculative execution of instructions, the Fetch PC value is a speculative fetch PC value and is not necessarily representative of the architectural state of the processor. Similar branch prediction methods are discussed in U.S. Pat. No. 5,136,697 entitled "System for Reducing Delay for Execution Subsequent to Correctly Predicted Branch Instruction Using Fetch Information Stored With Each Block of Instructions in Cache", naming William M. Johnson as inventor. Address block 110 includes a refresh latch 462 which is loaded with the current Fetch PC value on bus 106 and which value is driven back onto bus 106 by buffer 466 when the Fetch PC value is to be maintained into the next clock cycle. An incrementer 460 preferably receives the upper 28 bits of the Fetch PC (bits [31:4]) from the bus 106 and increments the Fetch PC value to address the next cache line by adding a "1" into the fourth bit position. The incremented value is driven back onto bus 106 by buffer 464 when the Fetch PC value is to be incremented for the next clock cycle while the lower 4 bits of bus 106 are forced to a "0" state by buffer 476 within the cache control 108. Thus, an arbitrary address (not quad-word aligned) initially used to prefetch an instruction stream (e.g., the target address of a branch instruction), is aligned to the next quad-word (16 byte) boundary when first incremented, and then incremented by 16 thereafter. The target address for such a branch is received from the BRNSEC 28 on bus 54. A buffer 472 drives the Target PC value onto the bus 106 when an TARGFPC signal is received from the cache control 108, as would be the case for a mispredicted branch. A buffer 474 receives the lower 4 bits of the Fetch PC conveyed on bus 106 and drives a block index which is initially loaded into the STBYTE pointer discussed earlier with respect to FIG. 9. Thus, the STBYTE pointer is set to address the first byte predicted-executed within a particular block.

A buffer 468 within the address block 110 drives the bus 106 with an address value residing on the internal address/data bus 52, as might be used to invalidate a cache block at such an address because of a subsequent write at that address (by either the same processor, as would occur in self-modifying code, or by another processor, as would be detected by bus-snooping), while a buffer 470 drives the Fetch PC value on bus 106 onto the internal address/data bus 106 for prefetching instructions into the ICACHE 10 from an external source. Buffers 478 and 480 drive the address tag value and the successor index from the cache array onto respective bits [31:12] and [11:0] of the bus 106, and are useful for branch prediction, and which is discussed more fully herewithin.

A more complete understanding of the operation of the ICACHE 10 may be appreciated in reference to FIGS. 14A–14L, which illustrate the contents of the BYTEQ 114, for an example sequence of X86 instructions and instruction alignments, through a series of processor clock cycles.

Figure 14A:
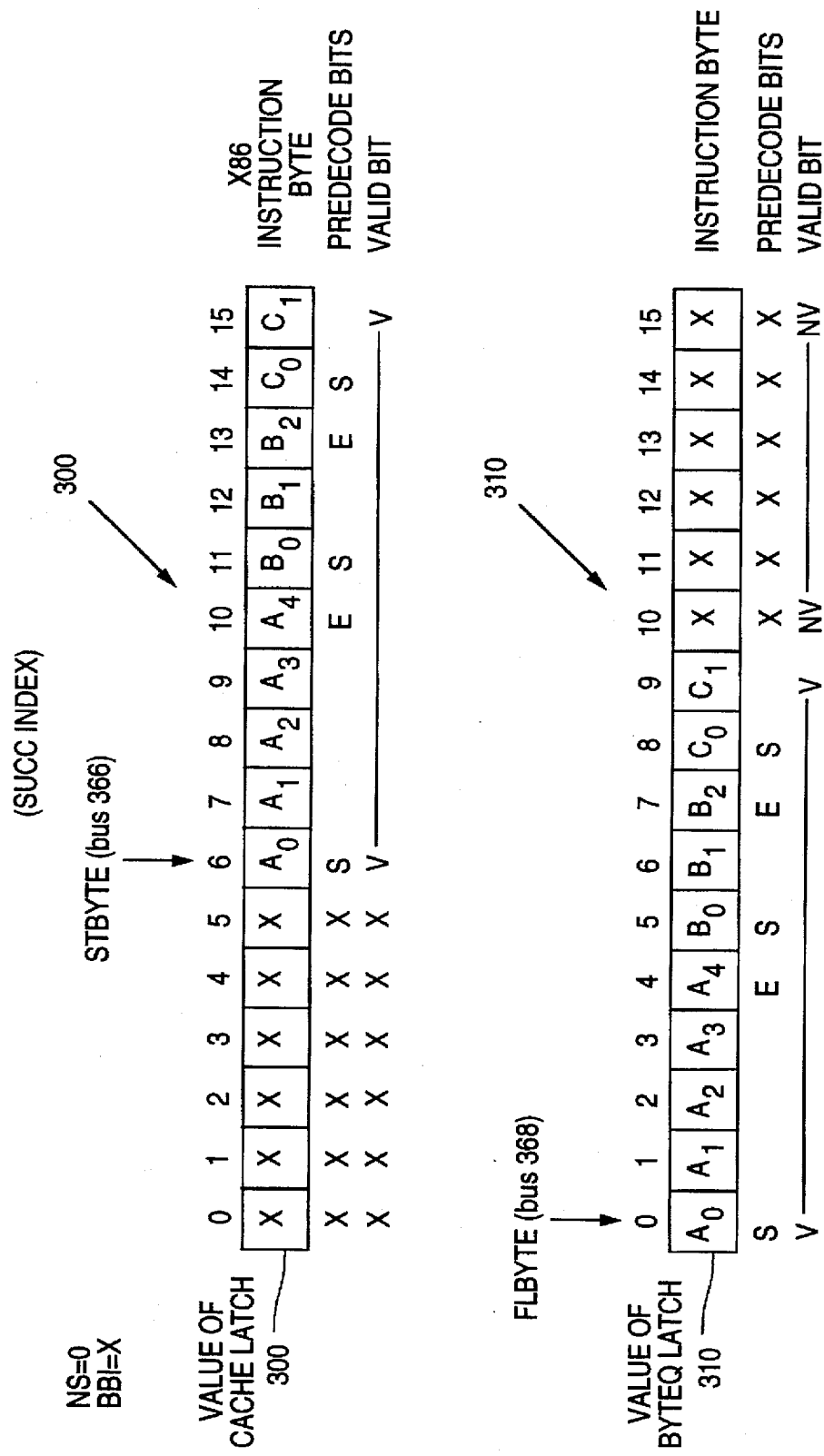
FIGS. 14A–14L illustrate, for an example sequence of instructions, the operation through several clock cycles, of the byte queue illustrated in the instruction cache of FIG. 3.

Referring to FIG. 14A, example instruction bytes are shown for both the cache latch 300 and the byteq latch 310. Each of the byte positions 0 through 15 of the cache latch 300 are shown and indicate the instruction byte, the predecode bits, and the byte-valid bit for each of the byte positions. Instruction byte $A_0$ is the first byte of an X86 instruction and is stored in position 6 of cache latch 300. Subsequent bytes of this same instruction are noted as a $A_1$ through $A_4$ which are loaded respectively into positions 7 through 10. Instruction byte $A_0$ is the starting byte of an X86 instruction and was predecoded with the starting bit set appropriately as is shown in FIG. 14A. Similarly, instruction byte $A_4$ in position 10 of ICACHE 200 is an ending byte of the A instruction and is shown as having been predecoded and stored with the end bit set appropriately as shown. Similarly, instruction B is indicated as a three byte X86 instruction and is loaded into positions 11, 12, and 13 of cache latch 300. The first byte $C_0$ of instruction C is loaded into position 14 while the second byte $C_1$ is loaded in position 15. It is clear from this FIG. 14A that instruction C is not fully present in cache latch 300 as there is no end bit present within the instruction.

The valid bits are appropriately set for all of the positions 6 through 15, inclusive, indicating that these bytes have been read out of the cache array 100 and are valid for forwarding into the BYTEQ 114 and subsequently into the IDECODE 12. A STBYTE pointer indicates the next byte to be shifted into the BYTEQ 114. The STBYTE pointer is currently set to position 6 as would be the case, for example, if a branch initially targeted this position within the cache block. Position 0 through 5 of cache latch 300 are shown as don't-cares, indicated by an "X." Since these byte positions fall ahead of the STBYTE pointer, they are not shifted into the BYTEQ.

Further, in FIG. 14A is shown the byteq latch 310 for the same clock cycle that the various instruction bytes are loaded into the cache latch 300. A fill byte pointer (FLBYTE pointer) indicates the next available position in the byteq latch 310. Some or all of the bytes loaded into the cache latch 300 are also simultaneously loaded into the byteq latch 310. As shown in FIG. 14A, the A instruction is simultaneously loaded into the byteq latch 310 starting at byte position 0, as directed by the FLBYTE pointer. Instruction bytes from the cache latch 300 initially indicated by the STBYTE pointer are loaded into the byteq latch 310 in the position indicated by the FLBYTE pointer. Subsequent bytes of the cache latch 300 are likewise loaded into the corresponding byte positions in the byteq latch 310. As such, instruction A occupies byteq latch 310, positions 0 through 4 while instruction B, as shown, is loaded into byte positions 5 through 7 and the first two bytes of instruction C are loaded as indicated in byte positions 8 and 9. The predecode bits and the byte-valid bits corresponding to each of these instruction bytes are similarly loaded into the respective byte positions of byteq latch 310 which are provided to the IDECODE 12 for instruction decoding.

In this example it is assumed that instruction A will fully dispatch upon instruction decode whereas instruction B will partially dispatch. That is, the ROPs into which the X86 instruction B is mapped are not all dispatched by the decoder to the core of the processor. One or more, but not all of the mapped ROPs for instruction B are dispatched during this cycle. The processing of instruction C at this point by the IDECODE would stall because no end bit is found. That is, upon seeing the start bit for instruction C in byte position 8 of byteq latch 310, the decoder scans the valid bytes and upon scanning byte position 10 of byteq latch 310, the byte is indicated as not valid and since an ending byte was not found, the decoder delays decoding of this instruction until the entire instruction is contained in the byte queue.

Figure 14B:
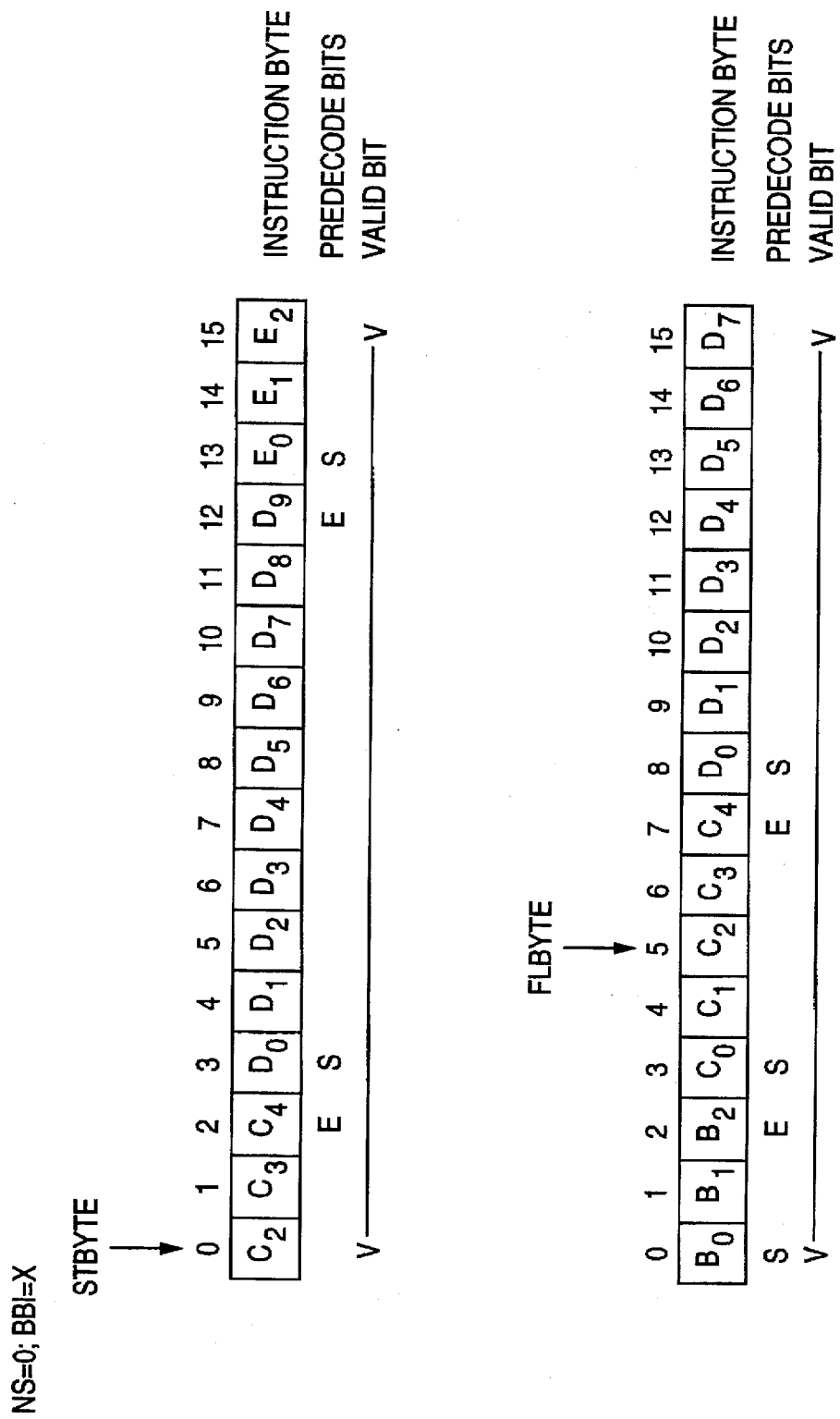

Referring now to FIG. 14B, as all of the previous contents of cache latch 300 have been transferred to the byteq latch 310, the CACHE has accessed the next instruction block and has loaded that instruction block into cache latch 300. The STBYTE pointer is reset to position 0, as all previous bytes were transferred successfully from the former contents of cache latch 300. As can be seen, the next instruction byte of instruction C, namely instruction byte $C_2$ is loaded in byte position 0 of the cache latch 300 and subsequent byte positions contain instruction bytes for instruction byte D (loaded into byte positions 3 through 12), and a partial instruction E, loaded into byte positions 13 through 15. The valid bit is appropriately set for all 16 byte positions. The start byte and ending byte indicators are set appropriately as shown, being predecoded before storing into the cache when this particular cache line was fetched from external memory. For this example the non-sequential bit (NSEQ) is assumed to be 0, indicating no predicted taken branch within this instruction block and consequently the block branch index, as indicated by an "X," is a don't-care.

Referring to the byteq latch 310 as shown in FIG. 14B, instruction B has been shifted to the beginning of the byteq latch 310. Instruction byte Be is the first byte of the B instruction and is shifted into byte position 0 of the byteq latch 310. $C_0$ and $C_1$, are shifted respectively into byte positions 3 and 4 having been previously loaded into the byteq latch 310 during an earlier cycle. Consequently, the FLBYTE pointer is set to position 5 indicating the first available byte position not containing data from a previous fill operation. Since the STBYTE pointer is set to position 0 of the cache latch 300 and the FLBYTE pointer is set to position 5 of the byteq latch 310, the remainder of the byteq latch 310 will be loaded with instruction bytes $C_2$ through $D_7$ from the cache latch 300. The respective PREDECODE bits and VALID bits are likewise also set as is the case whenever an instruction byte is loaded from the cache latch 300 to the byteq latch 310. The decoder is then presented with 16 instruction bytes, in this case representing the entirety of instruction B, the entirety of instruction C, and a portion of instruction D. All 16 instruction bytes are indicated as being valid. As before, the decoder will scan the byte positions and will determine that instructions B and C are complete whereas instruction D, lacking an end bit indicator, is incomplete. For this example assume that instruction B will completely dispatch upon decode and that instruction C will likewise fully dispatch. D as stated previously, can not decode because there is no end bit. In other words, the entire instruction D is not present in the BYTEQ 114, therefore the decoder must wait.

Figure 14C:
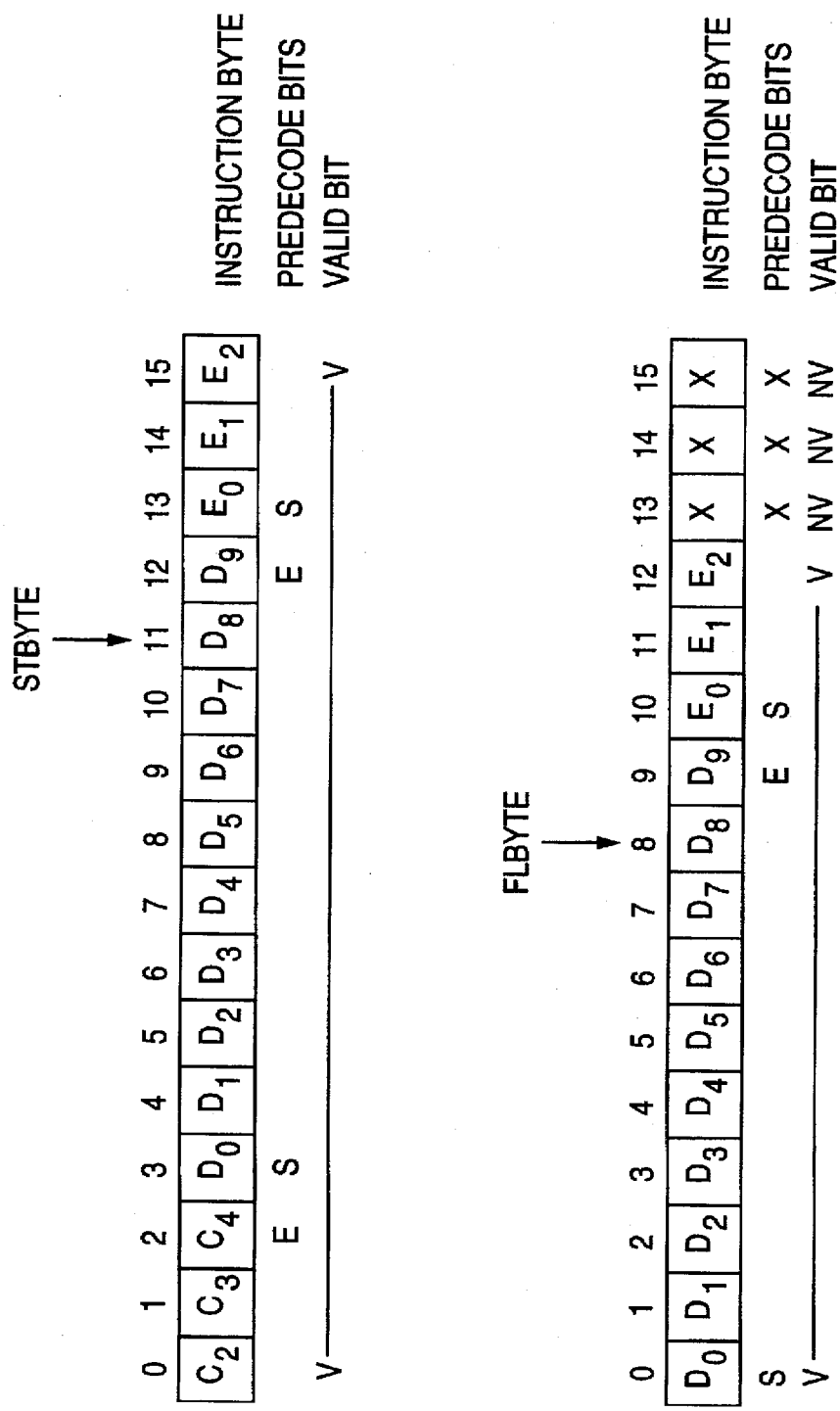

Referring now to FIG. 14C, the STBYTE pointer is set to position 11 of the cache latch 300 indicating the next byte position ready to shift into the byteq latch 310. The contents of cache latch 300 are identical to that in the previous cycle, as shown in FIG. 14B, because not all of the instruction bytes have been fully transferred into the byteq latch 310. Again, assuming from the previous cycle that instructions B and C decoded and fulled dispatched, instruction D is now shown as being shifted to byte position 0, or the head of the byteq latch 310. The FLBYTE pointer is now set to position 8 which steers the instruction bytes starting from the STBYTE pointer location into the byteq latch 310 at the FLBYTE pointer location. The remainder of instruction D is shown as transferred into byte positions 8 and 9, respectively, of byteq latch 310 while the first three bytes of instruction E are shown as having been transferred into byte positions 10 through 12 of the byteq latch 310. Byte positions 13 through 15 of byteq latch 310 are set to be non-valid as there are no additional bytes left in the cache latch 300 which can be loaded into the byteq latch 310. Clearing the valid bit for these byte positions (shown as NV in these figures) indicates to the IDECODE that the instruction bytes are not valid and that decoding should not proceed. For this example, assume instruction D, which is fully available to the IDECODE during this cycle, maps into an MROM routine and will hold at this position until all of the ROPs from the MROM routine are dispatched.

Figure 14D:
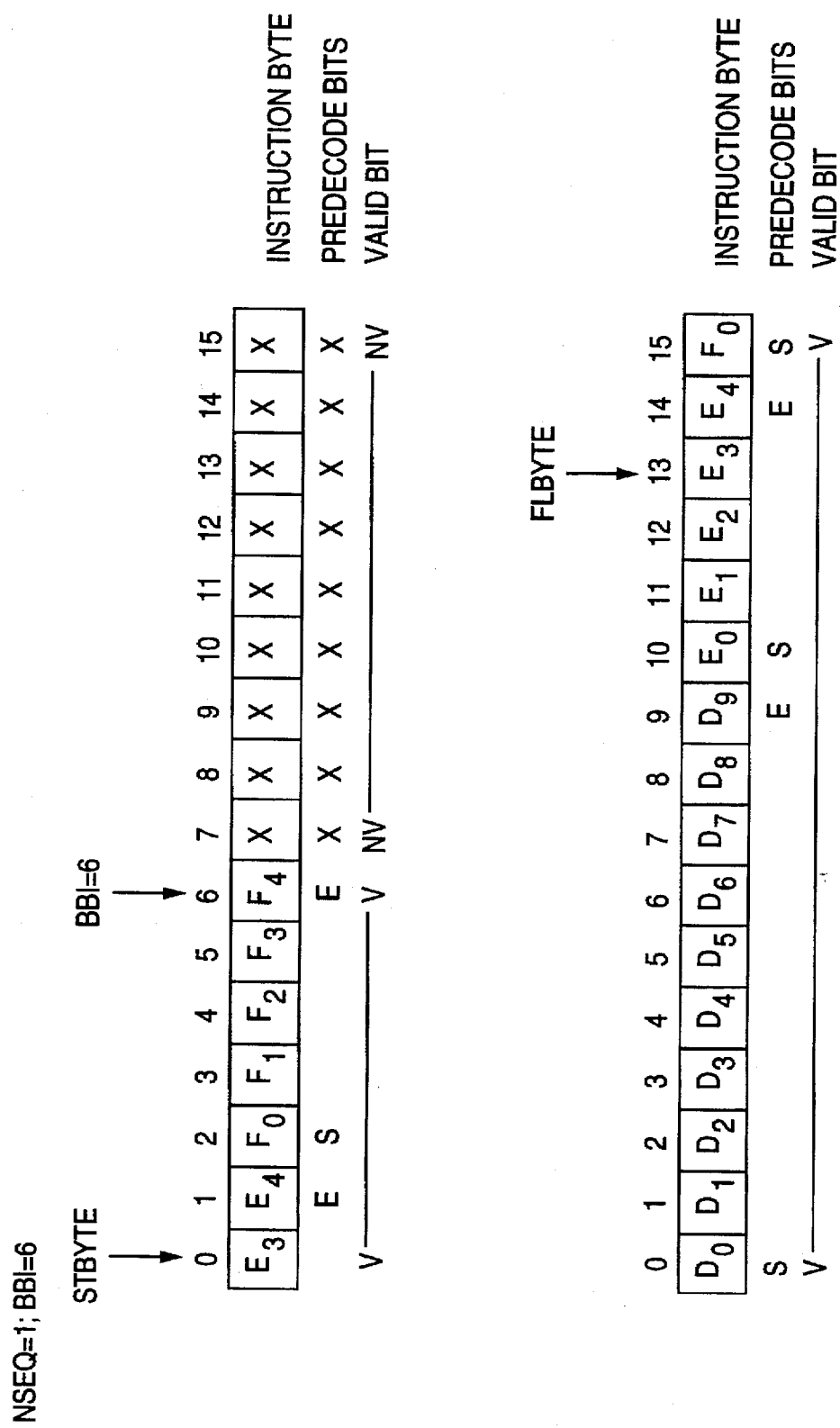

Referring now to FIG. 14D, instruction D is shown still loaded into byte positions 0 through 9 of the byteq latch 310. However, because the previous contents of the cache latch 300 had been fully transferred after the last cycle, a new cache access has occurred and which has loaded new information into the cache latch 300. The STBYTE pointer is reset to position 0 while the FLBYTE pointer is currently set to byte position 13 of the byteq latch 310. In this example the cache line loaded into cache latch 300 is assumed to contain a predicted branch which is indicated by the NSEQ bit being asserted. Instruction F, loaded into byte positions 2 through 6 of the cache latch 300, is the branch instruction that is predicted taken. Consequently, the Block Branch Index (BBI) is set to position 6 which marks the last byte of the branch instruction so predicted as being taken. The instruction bytes within the cache line that fall beyond the end of the branch instruction, in this example, those instruction bytes loaded into byte positions 7 through 15 of the cache latch 300 are all marked as non-valid so as to not load into the byteq latch 310. Thus, the byte-valid bits actually loaded into the byteq 114 are "clipped" by the BBI when NSEQ=1. Only the instruction bytes and related PREDECODE bits and VALID bits for those instructions starting with the byte position indicated by the STBYTE pointer and including the valid instruction bytes from that point within the cache latch 300 are transferred into the byteq latch 310 (In this example, the $E_3$ and $E_4$ instruction bytes and the $F_0$ through $F_4$ instruction bytes). Byte positions 7 through 15, falling beyond the branch instruction predicted taken are not predicted to be executed and consequently are not loaded into the byteq latch 310. The FLBYTE pointer is set to byte position 13 of byteq latch 310, which during this cycle allows the transfer of instruction bytes $E_3$, $E_4$, and $F_0$ into the byteq latch 310. It is assumed that instruction D finishes the microcode (MROM) routine and will shift out of the BYTEQ after this cycle, which will shift instruction byte $E_0$, currently in byte position 10, to the head of the byteq latch 310 in byte position 0.

Figure 14E:
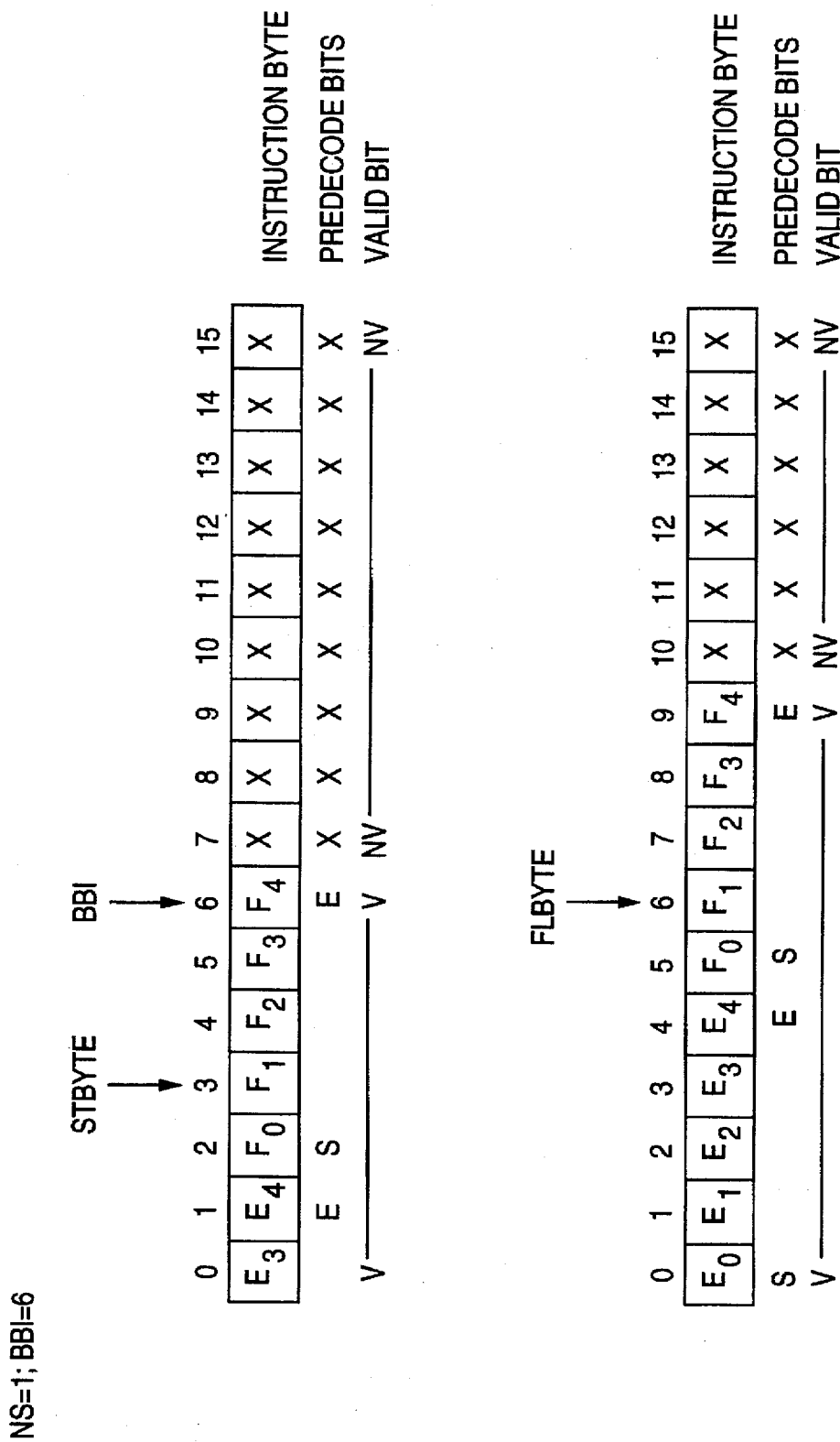

Referring now to FIG. 14E, the contents of the cache latch 300 are un-changed from the previous cycle, but the STBYTE pointer is now set to position 3 indicating the next byte position to shift into the byteq latch 310. Instruction E is shown as being shifted to the head of the byteq latch 310. The remainder of instruction F has been shifted into the byteq latch 310 as the FLBYTE pointer is set to position 6. The entire F instruction is now contained within the byteq latch 310 and subsequent byte positions are all marked as being non-valid. The decoder scans the byteq latch 310 and upon detecting both start byte and end byte indications for two complete instructions will attempt a simultaneous decode of both the E instruction and the F instruction. In this example assume that E will fully dispatch and that the branch instruction, instruction F, will partially dispatch (although most branch instructions except CALLs are typically single-ROP instructions).

Figure 14F:
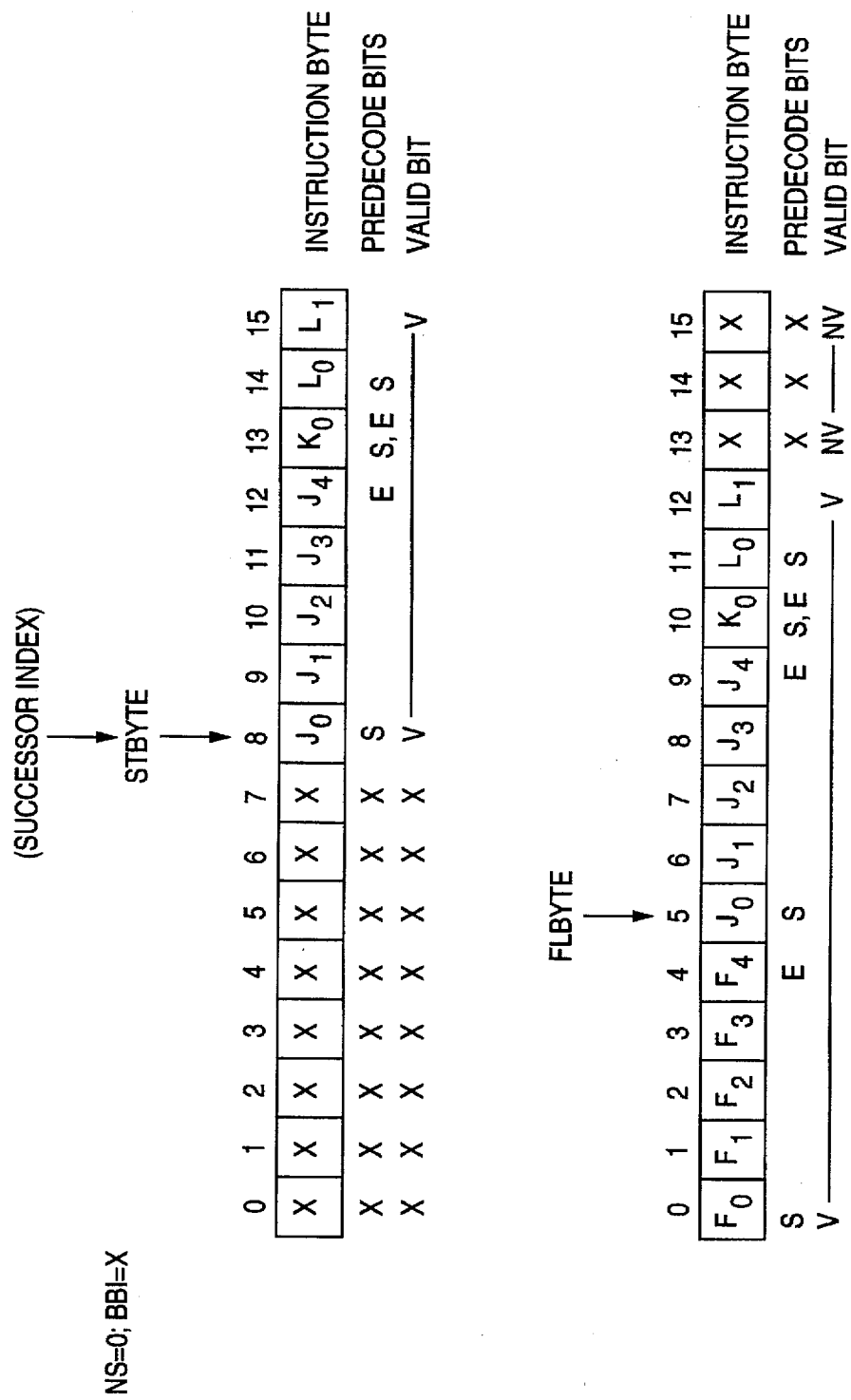

Referring now to FIG. 14F, a new cache line is loaded and is shown in cache latch 300. The branch instruction F was predicted taken and the STBYTE pointer is set to the lower portion of the successor index and indicates the instruction byte within the cache line that the branch instruction is predicted to branch to. In this example instruction J is shown loaded into byte positions 8 through 12 of the cache latch 300. Bytes previous to byte position 8 are don't-cares. The FLBYTE pointer is set to position 5 of the byteq latch 310 to indicate the next available byte position for shifting instruction bytes into. Consequently, the valid instruction bytes $J_0$ through $L_1$ and which are located in byte positions 8 through 15 of the cache latch 300 are loaded into byte positions 5 through 12 of the byteq latch 310. Byte positions 13 through 15 of the byteq latch 310 are not loaded during this transfer and are marked as not valid, thus preventing the decoder from attempting to decode any instruction bytes remaining in these byte positions. In this example assume that instructions F, J, and K (which is a one byte instruction) will fully dispatch. Instruction L cannot decode because there is no end byte within the valid instruction bytes.

Figure 14G:
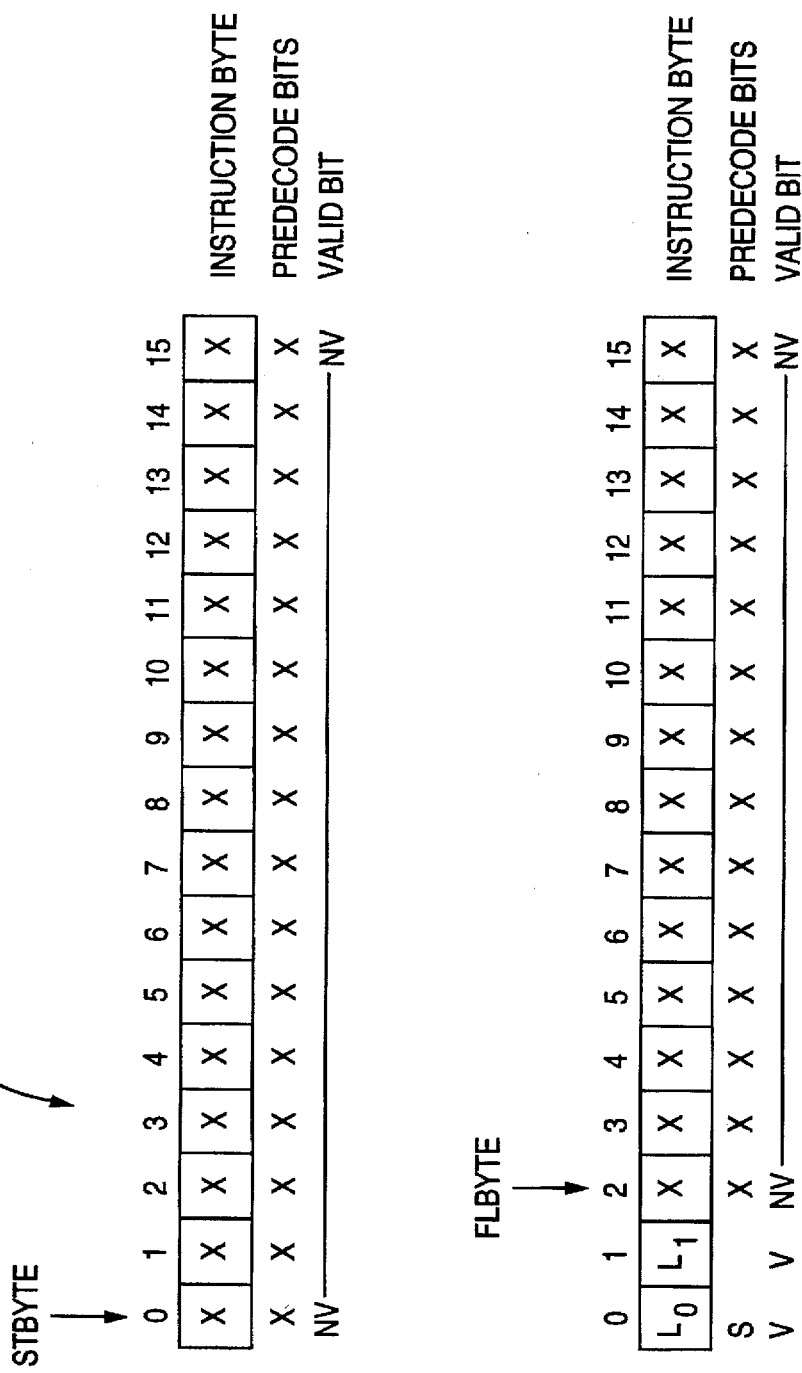

Referring now to FIG. 14G, instruction byte $L_0$ is shown at the head of the byteq latch 310 in byte position 0, and instruction byte $L_1$ in byte position 1. The remainder of the byte positions 2 through 15 are marked as not valid and the FLBYTE pointer is set byte position 2. In this example, the L instruction is a partially cached instruction. The remainder of the L instruction bytes have been replaced by a different cache block overriding the remainder of these instructions bytes. Consequently, the sequential cache access attempting to load the remainder of the L instruction fails (a cache "miss") which is loaded into the cache latch 300 by indicating all 16 byte positions as not being valid. The STBYTE pointer is reset to byte position 0, but there are no valid instruction bytes currently in the cache latch 300. Consequently, no effective transfer take place during this cycle. The cache control 108 initiates a series of actions including a prefetch of the remainder of the L instruction. The 16 bytes of the appropriate cache block are loaded through the predecode block 112 for assignment of predecode bits and are written one instruction at a time, up to four bytes per clock cycle, into both the cache array 100 and into the cache latch 300.

Figure 14H:
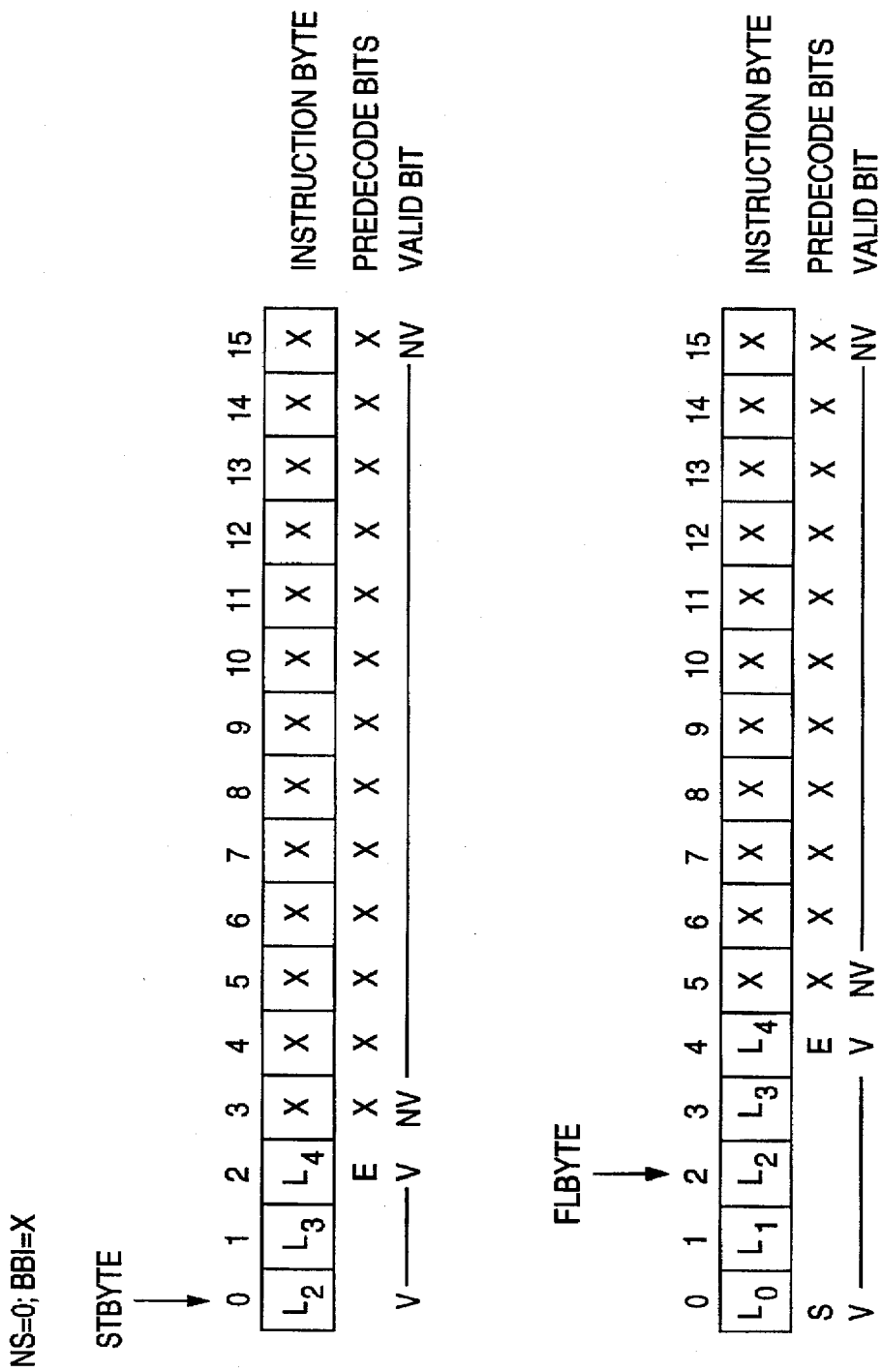

Referring now to FIG. 14H, during this cycle the remainder of the L instruction is shown loaded into byte position 0 through 2 of cache latch 300. These three byte positions are set to valid positions while the remainder, byte positions 3 through 15 are still not valid. Because the STBYTE pointer is now set to a byte position which contains valid instruction bytes, these bytes are transferred into the byteq latch 310 as directed by the FLBYTE pointer, which in this case loads instruction bytes $L_2$, $L_3$, and into byte positions 2, 3, 4, respectively, of byteq latch 310. In this example, assume that L will fully dispatch after this cycle and will shift out of the byteq latch 310.

Figure 14I:
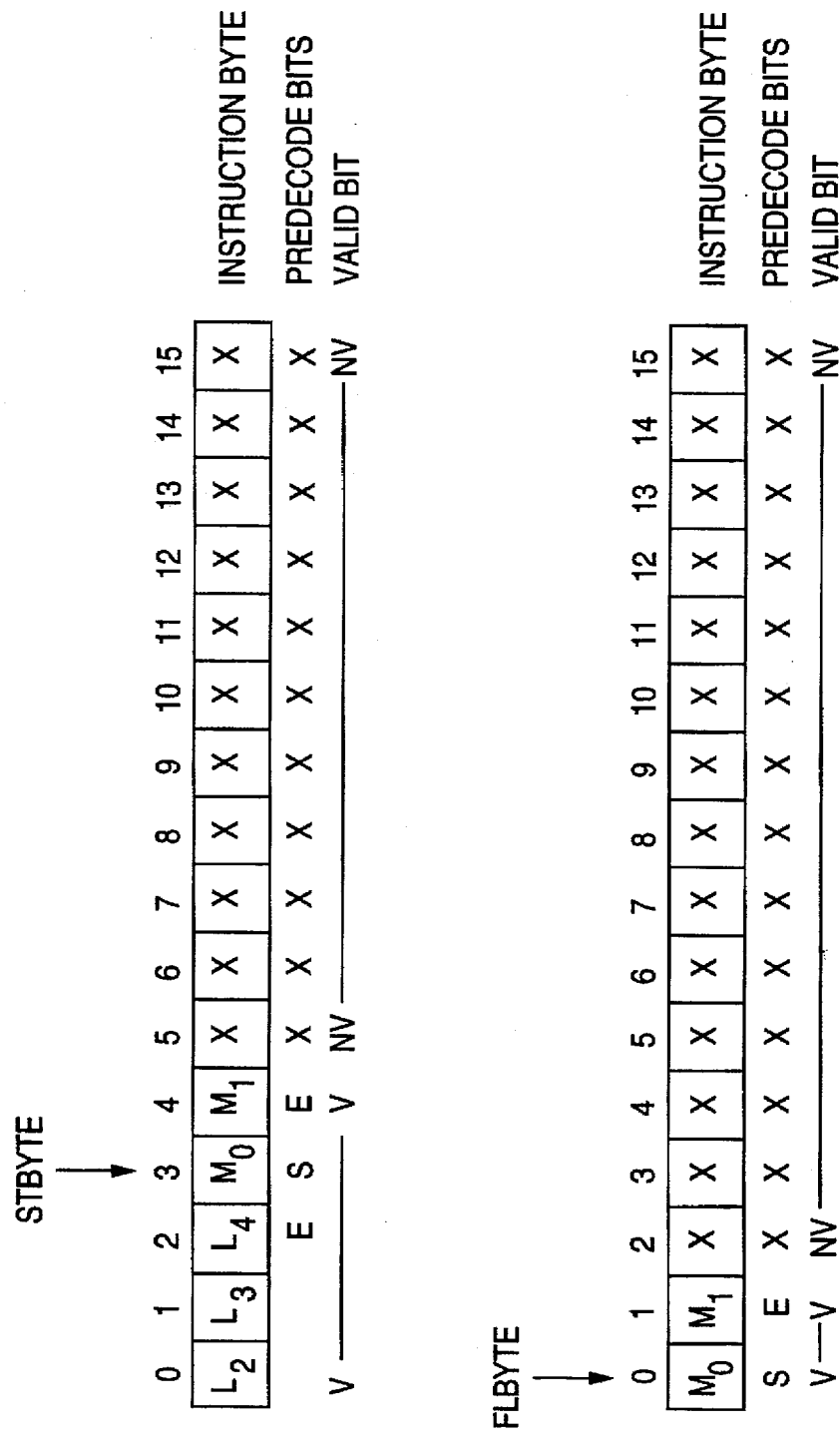

Referring now to FIG. 14I, the cache line continues to refill as shown in this example and which indicates an M instruction now loaded into byte positions 3 and 4 of cache latch 300. The previous L instruction bytes are still loaded into byte positions 0 through 2 of cache latch 300. The M instruction is transferred to byte position 0 of the byteq latch 310 as directed by the FLBYTE pointer being set to position 0. The byteq latch 310 now contains a complete instruction (all instruction bytes of the M instruction indicating both a start byte and an end byte being valid bytes) and will therefore decode. In this example assume that the M instruction will fully dispatch and will consequently shift out of the byte queue.

Figure 14J:
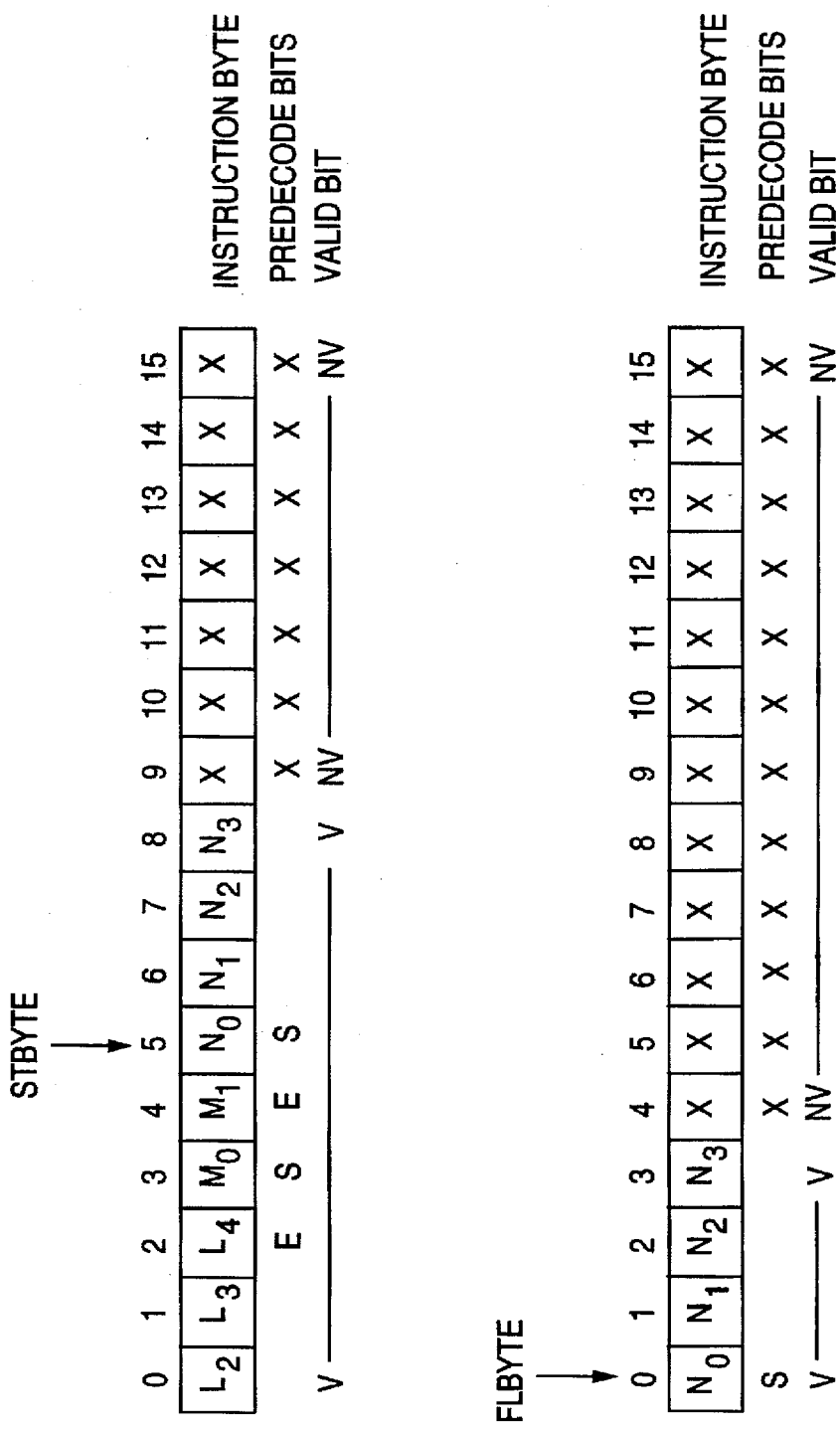

Referring now to FIG. 14J, the cache line continues to refill. The STBYTE pointer is set to position 5 while the FLBYTE pointer is again reset to byte position 0 of the byteq latch 310. In this example, instruction N is shown four bytes of which have been loaded into byte positions 5 through 8 of the cache latch 300 which byte positions have been set to indicated valid instruction bytes and which bytes have likewise been loaded into byte positions 0 through 3 of the byteq latch 310. However, the decoder cannot proceed to decode this instruction because there is no end byte as yet. Instruction N is longer than four bytes long and will take more than one cycle to fill into the cache line and into the byteq 114. Note that writing only up to 4 bytes/clock cycle is merely an implementation choice which may be optimized to increase performance at the expense of increased hardware.

Figure 14K:
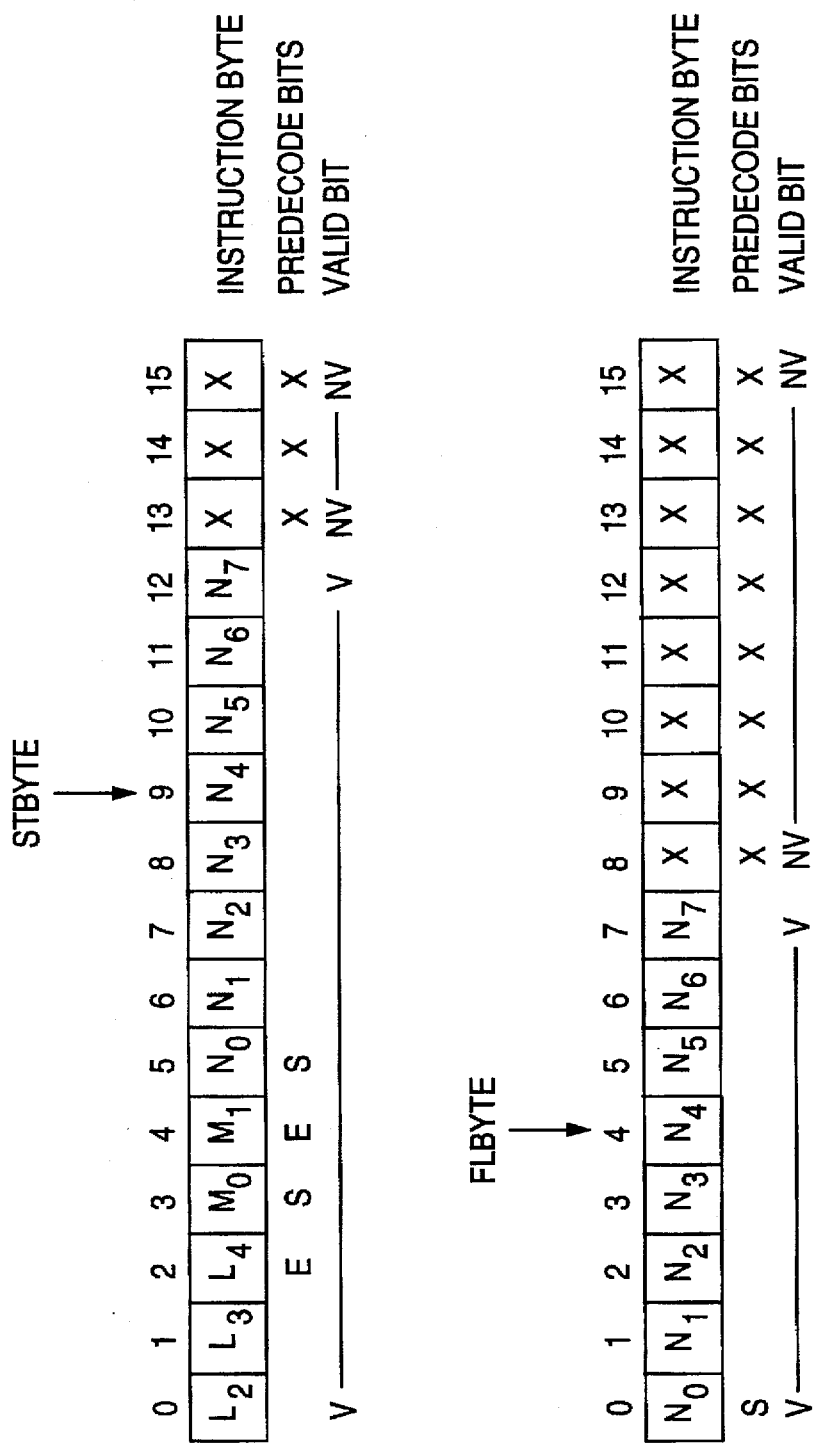

FIG. 14K shows the next four instruction bytes $N_4$ through $N_7$, loaded into byte positions 9 through 12, respectively, of the cache latch 300. The FLBYTE pointer is set to byte position 4 of the byteq latch 310 to indicate the position where these additional bytes are to be loaded. As before, however, the entire N instruction is not contained in the byteq latch 310, and will therefore not decode.

Figure 14L:
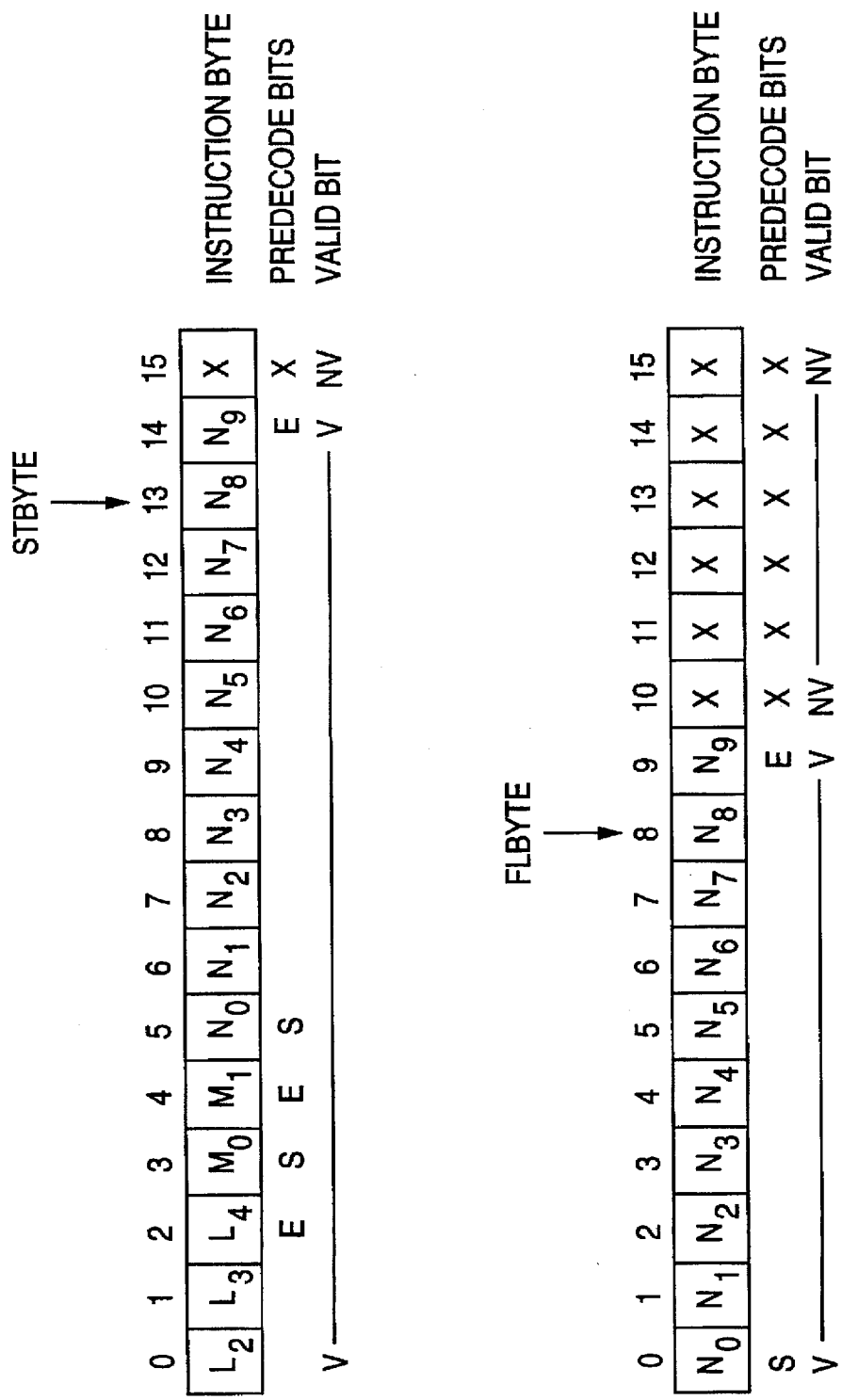

Referring now to FIG. 14L, the STBYTE pointer is set to byte position 13 at which byte position instruction byte $N_8$ is loaded and the last byte, $N_9$ is loaded into byte position 14 of cache latch 300. Only two bytes are loaded into the cache latch 300 during this cycle because only bytes from a single instruction are loaded during a single cycle. The FLBYTE pointer is set to position 8 of the byteq latch 310 which directs the transfer of instruction bytes $N_8$ and $N_9$ into byte positions 8 and 9, respectively, of the byteq latch 310. At this point, the complete N instruction is present in the byteq latch 310 and will decode. The cache line lacks one byte from being completely refilled. That will continue on the next cycle. As discussed previously for other instructions, The N instruction will shift out of the byte queue if fully dispatched and will remain at the head of the byte queue if partially dispatched.

As indicated by this example from FIG. 14A–14L, a partially-present instruction will not erroneously decode because the decoder checks for an end byte present within the BYTEQ before decoding an instruction. Such a partial-instruction situation is a frequent occurrence when filling the BYTEQ from a cache line, especially during instruction prefetch, and is quite normal. However, several related but more potentially severe cache anomolies are also detected from the predecode bits within the BYTEQ. For example, a start byte following another start byte, with no interleaving end byte therebetween, is a predecode anomoly which should never occur in a normal instruction stream. Its presence may be a result of a code stream executing into a given block of instruction memory from two different sequential paths, resulting in predecode bit assignments for instruction bytes within the cache which is appropriate for one instruction stream and incorrect for the other. Consecutive start bytes are detected and corrected by flushing the cache and forcing a refill, which re-assigns the predecode bits accoding to the instruction sequence at hand. Similarly, consecutive end bytes are likewise detected and corrected.

The first time a branch is executed to a given target address, the predecode bits are asigned as the instruction bytes starting at the target address are initially cached, and the instruction byte at the target address itself is assigned to be a start byte, as would be expected. Decoding of the instruction bytes beginning at the target address proceeds as such. Upon subsequently executing a predicted branch to the same target address which has been previously cached, the instruction byte at the target address of the branch is expected to be the start byte for the next instruction, as would have been previously assigned during the first execution of the code at the address. If the instruction byte at a target address of a previously cached instruction is ever found to be other than a start byte, then the predecode bits in the cache are inconsistent with the instructions being executed, and the cache is consequently flushed and refilled.

While a particular embodiment of the present invention has been shown and described, modifications may be made, and it is therefore intended to cover in the appended claims all such changes and modifications which fall within the true spirit and scope of the invention.

What is claimed is:

1. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes;

first means for prefetching a plurality of instruction bytes from an instruction source;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to an instruction decoder of the processor;

wherein the variable byte-length instruction format is the X86 instruction set format, and wherein the at least one predecode bit corresponding to each of the instruction bytes includes a group of predecode bits collectively set to:

a first value to indicate that the corresponding instruction byte, as prefetched and predecoded, is a prefix byte;

a second value to indicate that the corresponding instruction byte, as prefetched and predecoded, is an opcode byte;

a third value to indicate that the corresponding instruction byte, as prefetched and predecoded, is a MODR/M byte;

a fourth value to indicate that the corresponding instruction byte, as prefetched and predecoded, is an S-I-B byte; and a fifth value to indicate that the corresponding instruction byte, as prefetched and predecoded, is a DISP/IMM byte.

2. An instruction cache as in claim 1 wherein the at least one predecode bit corresponding to each of the instruction bytes includes a bit for indicating, when asserted, that the corresponding instruction byte, as prefetched and predecoded, is a starting byte of an instruction.

3. An instruction cache as in claim 1 wherein the at least one predecode bit corresponding to each of the instruction bytes includes a bit for indicating, when asserted, that the corresponding instruction byte, as prefetched and predecoded, is an ending byte of an instruction.

4. In a super-scalar CISC processor of the type having a variable byte-length instruction format wherein each CISC instruction is mapped to a corresponding sequence of one or more internal RISC-like instructions for execution within a superscalar RISC-like core processor, an instruction cache comprising:

an array for storing a plurality of instruction blocks, each of the instruction blocks comprising a plurality of CISC instruction bytes and at least one corresponding predecode bit for each of the CISC instruction bytes;

first means for prefetching a plurality of CISC instruction bytes from an instruction source;

second means for predecoding each of the prefetched CISC instruction bytes to determine the at least one corresponding predecode bit for each prefetched CISC instruction byte, the at least one predecode bit including a field for indicating CISC instruction boundaries among the plurality of prefetched CISC instruction bytes;

third means for storing the plurality of prefetched CISC instruction bytes and corresponding at least one predecode bit for each prefetched CISC instruction byte into an instruction block within the array; and fourth means for delivering a requested stream of CISC instruction bytes and corresponding at least one predecode bit from an instruction block within the array to an instruction decoder of the processor;

wherein the at least one predecode bit corresponding to each of the CISC instruction bytes includes:

a first bit for indicating, when asserted, that the corresponding CISC instruction byte, as prefetched and predecoded, is a starting byte of a CISC instruction; and a second bit for indicating, when asserted, that the corresponding CISC instruction byte, as prefetched and predecoded, is an ending byte of a CISC instruction.

5. An instruction cache as in claim 4 wherein:

said instruction source includes an external memory for storing said plurality of instruction bytes;

said first means comprises an interface unit for accessing said plurality of instruction bytes stored within said external memory; and further comprising an external bus coupled to said external memory and to said interface unit.

6. An instruction cache as in claim 4 wherein said fourth means comprises:

a queue for buffering a plurality of instruction bytes;

means for loading instruction bytes into available positions of said queue; and means for shifting the instruction bytes within said queue in response to information received from said instruction decoder corresponding to the number of instruction bytes processed by said decoder, and for aligning unprocessed instruction bytes at the head of said queue.

7. An instruction cache as in claim 4, the instruction cache further comprising a fifth means for consolidating at least one prefix byte associated with an opcode byte into a consolidated prefix byte containing prefix information from each of the at least one prefix byte.

8. In a super-scalar CISC processor of the type having a variable byte-length instruction format wherein each CISC instruction is mapped to a corresponding sequence of one or more internal RISC-like instructions for execution within a superscalar RISC-like core processor, an instruction cache comprising:

an array for storing a plurality of instruction blocks, each of the instruction blocks comprising a plurality of CISC instruction bytes and at least one corresponding predecode bit for each of the CISC instruction bytes;

first means for prefetching a plurality of CISC instruction bytes from an instruction source;

second means for predecoding each of the prefetched CISC instruction bytes to determine the at least one corresponding predecode bit for each prefetched CISC instruction byte, the at least one predecode bit including a field for indicating CISC instruction boundaries among the plurality of prefetched CISC instruction bytes;

third means for storing the plurality of prefetched CISC instruction bytes and corresponding at least one predecode bit for each prefetched CISC instruction byte into an instruction block within the array; and fourth means for delivering a requested stream of CISC instruction bytes and corresponding at least one predecode bit from an instruction block within the array to an instruction decoder of the processor; wherein the at least one predecode bit corresponding to each of the CISC instruction bytes includes a first group of bits for identifying a CISC instruction byte according to which instruction fields, as prefetched and predecoded, are provided by the CISC instruction byte.

9. An instruction cache as in claim 8 wherein the variable byte-length instruction format is the X86 instruction set format, and wherein the first group of predecode bits corresponding to each of the CISC instruction bytes is collectively set to:

a first value to indicate that the corresponding CISC instruction byte, as prefetched and predecoded, is an X86 prefix byte;

a second value to indicate that the corresponding CISC instruction byte, as prefetched and predecoded, is an X86 MODR/M byte;

a third value to indicate that the corresponding CISC instruction byte, as prefetched and predecoded, is an X86 S-I-B byte;

a fourth value to indicate that the corresponding CISC instruction byte, as prefetched and predecoded, is an X86 DISP/IMM byte;

a fifth value to indicate that the corresponding CISC instruction byte, as prefetched and predecoded, is an X86 opcode byte which is mapped into 1 internal RISC-like instruction;

a sixth value to indicate that the corresponding CISC instruction byte, as prefetched and predecoded, is an X86 opcode byte which is mapped into a sequence of 2 internal RISC-like instructions;

a seventh value to indicate that the corresponding CISC instruction byte, as prefetched and predecoded, is an X86 opcode byte which is mapped into a sequence of 3 internal RISC-like instructions; and an eighth value to indicate that the corresponding CISC instruction byte, as prefetched and predecoded, is an X86 opcode byte which is mapped into a sequence of 4 or more internal RISC-like instructions.

10. In a super-scalar CISC processor of the type having a variable byte-length instruction format wherein each CISC instruction is mapped to a corresponding sequence of one or more internal RISC-like instructions for execution within a superscalar RISC-like core processor, an instruction cache comprising:

an array for storing a plurality of instruction blocks, each of the instruction blocks comprising a plurality of CISC instruction bytes and at least one corresponding predecode bit for each of the CISC instruction bytes;

first means for prefetching a plurality of CISC instruction bytes from an instruction source;

second means for predecoding each of the prefetched CISC instruction bytes to determine the at least one corresponding predecode bit for each prefetched CISC instruction byte, the at least one predecode bit including a field for indicating CISC instruction boundaries among the plurality of prefetched CISC instruction bytes;

third means for storing the plurality of prefetched CISC instruction bytes and corresponding at least one predecode bit for each prefetched CISC instruction byte into an instruction block within the array; and fourth means for delivering a requested stream of CISC instruction bytes and corresponding at least one predecode bit from an instruction block within the array to an instruction decoder of the processor;

wherein the at least one predecode bit corresponding to each of the CISC instruction bytes includes a second group of bits for indicating whether the corresponding CISC instruction byte, as prefetched and predecoded, is a CISC opcode byte, and for indicating the number of internal RISC-like instructions that the corresponding CISC instruction, as prefetched and predecoded, is mapped into.

11. An instruction cache as in claim 10 wherein the variable byte-length instruction format is the X86 instruction set format, and wherein the second group of pre-decode bits corresponding to each of the CISC instruction bytes includes:

a first bit for indicating whether the corresponding CISC instruction byte, as prefetched and predecoded, is a CISC opcode byte;

a second and third bit for indicating the number of internal RISC-like instructions that a corresponding CISC instruction is mapped into, wherein the second and third predecode bits are collectively set to:

a first value to indicate that the corresponding CISC instruction, as prefetched and predecoded, is mapped into 1 internal RISC-like instruction;

a second value to indicate that the corresponding CISC instruction, as prefetched and predecoded, is mapped into a sequence of 2 internal RISC-like instructions;

a third value to indicate that the corresponding CISC instruction, as prefetched and predecoded, is mapped into a sequence of 3 internal RISC-like instructions; and an fourth value to indicate that the corresponding CISC instruction, as prefetched and predecoded, is mapped into a sequence of 4 or more internal RISC-like instructions.

12. An instruction cache as in claim 10 wherein the variable byte-length instruction format is the X86 instruction set format, and wherein the second group of predecode bits corresponding to each of the CISC instruction bytes is collectively set to:

a first value to indicate that the corresponding CISC instruction byte, as prefetched and predecoded, is a CISC opcode byte for a CISC instruction which is mapped into 1 internal RISC-like instruction;

a second value to indicate that the corresponding CISC instruction byte, as prefetched and predecoded, is a CISC opcode byte for a CISC instruction which is mapped into a sequence of 2 internal RISC-like instructions;

a third value to indicate that the corresponding CISC instruction byte, as prefetched and predecoded, is a CISC opcode byte for a CISC instruction which is mapped into a sequence of 3 internal RISC-like instructions; and a fourth value to indicate that the corresponding CISC instruction byte, as prefetched and predecoded, is a CISC opcode byte for a CISC instruction which is mapped into a sequence of 4 or more internal RISC-like instructions.

13. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes;

first means for prefetching a plurality of instruction bytes from an instruction source;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to an instruction decoder of the processor;

wherein said array comprises:

a store array for storing said plurality of instruction blocks;

a tag array for storing a plurality of cache tags, each of said cache tags corresponding to a respective instruction block stored within said store array; and a successor array for storing branch information corresponding to each instruction block stored within said store array, said branch information indicating whether a branch instruction is stored within a corresponding instruction block, and if so, the location of the branch instruction within said instruction block.

14. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes;

first means for prefetching a plurality of instruction bytes from an instruction source;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to an instruction decoder of the processor;

wherein said second means comprises:

a group of registers for storing a plurality of instruction bytes prefetched from said instruction source, said group of registers providing sufficient storage for storing instruction bytes corresponding to at least two instruction blocks of said instruction cache;

an assign block coupled to the group of registers for determining, in response to a starting point within said group of registers, the location of various individual instruction bytes corresponding to various instruction fields; and a lookup table block, coupled to the assign block, for receiving therefrom a plurality of instruction fields for a given instruction, and for returning thereto a plurality of status indicators and descriptor fields.

15. An instruction cache as in claim 14 wherein said second means further comprises a scan/parse block for receiving from said fourth means a plurality of instruction bytes and corresponding at least one predecode bit already provided thereto and representing a partial instruction, and for providing to said assign block a plurality of descriptor fields corresponding to said partial instruction.

16. An instruction cache as in claim 14 wherein the assign block comprises means for providing, in response to at least one prefix byte associated with an opcode byte, a consolidated prefix byte to the lookup table block, the consolidated prefix byte containing prefix information from the at least one prefix byte.

17. An instruction cache as in claim 16 wherein the providing means comprises:

means for scanning the prefetched instruction bytes beginning at a starting byte; and means for recoding each prefix byte to include prefix information from previous prefix bytes within an instruction.

18. An apparatus for processing information comprising:

an external memory for holding the information; and a processor coupled to said external memory via a processor bus, said processor including an instruction cache coupled to said external memory;

an instruction decoder coupled to said instruction cache;

a plurality of registers coupled to said external memory;

a plurality of functional units, each coupled to the plurality of registers and coupled to the instruction decoder;

wherein said instruction cache includes an array for storing a plurality of instruction blocks, each of the instruction blocks comprising a plurality of instruction bytes and at least one corresponding predecode bit for each of the instruction bytes;

first means for prefetching a plurality of instruction bytes from said external memory;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to the instruction decoder of the processor;

wherein said fourth means comprises:

a queue for buffering a plurality of instruction bytes;

means for loading instruction bytes into available positions of said queue; and means for shifting the instruction bytes within said queue in response to information received from said instruction decoder corresponding to the number of instruction bytes processed by said decoder, and for aligning unprocessed instruction bytes at the head of said queue.

19. An apparatus as in claim 18 wherein the at least one predecode bit corresponding to each of the instruction bytes includes a bit for indicating, when asserted, that the corresponding instruction byte, as prefetched and predecoded, is a starting byte of an instruction.

20. An apparatus as in claim 18 wherein the at least one predecode bit corresponding to each of the instruction bytes includes a bit for indicating, when asserted, that the corresponding instruction byte, as prefetched and predecoded, is an ending byte of an instruction.

21. An apparatus as in claim 18 wherein the at least one predecode bit corresponding to each of the instruction bytes includes a bit for indicating, when asserted, that the corresponding instruction byte, as prefetched and predecoded, is an opcode byte of an instruction.

22. An apparatus as in claim 18 wherein the at least one predecode bit corresponding to each of the instruction bytes includes a group of bits for identifying an instruction byte according to which instruction fields, as prefetched and predecoded, are provided by the corresponding instruction byte.

23. An apparatus for processing information comprising:

an external memory for holding the information; and a processor coupled to said external memory via a processor bus, said processor including an instruction cache coupled to said external memory;

an instruction decoder coupled to said instruction cache;

a plurality of registers coupled to said external memory;

a plurality of functional units, each coupled to the plurality of registers and coupled to the instruction decoder;

wherein said instruction cache includes an array for storing a plurality of instruction blocks, each of the instruction blocks comprising a plurality of instruction bytes and at least one corresponding predecode bit for each of the instruction bytes;

first means for prefetching a plurality of instruction bytes from said external memory;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to the instruction decoder of the processor;

wherein said array comprises:
a store array for storing said plurality of instruction blocks;
a tag array for storing a plurality of cache tags, each of said cache tags corresponding to a respective instruction block stored within said store array; and
a successor array for storing branch information corresponding to each instruction block stored within said store array, said branch information indicating whether a branch instruction in stored within a corresponding instruction block, and if so, the location of the branch instruction within said instruction block.

24. An apparatus for processing information comprising:
an external memory for holding the information; and
a processor coupled to said external memory via a processor bus, said processor including
an instruction cache coupled to said external memory
an instruction decoder coupled to said instruction cache;
a plurality of registers coupled to said external memory;
a plurality of functional units, each coupled to the plurality of registers and coupled to the instruction decoder;

wherein said instruction cache includes
an array for storing a plurality of instruction blocks, each of the instruction blocks comprising a plurality of instruction bytes and at least one corresponding predecode bit for each of the instruction bytes;
first means for prefetching a plurality of instruction bytes from said external memory;
second means for predecoding each of the prefetched instruction bytes to determine the at least one corresponding predecode bit for each prefetched instruction byte, the at least one predecode bit including a field for indicating instruction boundaries among the plurality of prefetched instruction bytes;
third means for storing the plurality of prefetched instruction bytes and corresponding at least one predecode bit for each prefetched instruction byte into an instruction block within the array; and
fourth means for delivering a requested stream of instruction bytes and corresponding at least one predecode bit from an instruction block within the array to the instruction decoder of the processor;

wherein said second means comprises:
a group of registers for storing a plurality of instruction bytes prefetched from said instruction source, said group of registers providing sufficient storage for storing instruction bytes corresponding to at least two instruction blocks of said instruction cache;
an assign block coupled to the group of registers for determining, in response to a starting point within said group of registers, the location of various individual instruction bytes corresponding to various instruction fields; and
a lookup table block, coupled to the assign block, for receiving therefrom a plurality of instruction fields for a given instruction, and for returning thereto a plurality of status indicators and descriptor fields.

25. An apparatus as in claim 24 wherein said second means further comprises a scan/parse block for receiving from said fourth means a plurality of instruction bytes and corresponding at least one predecode bit already provided thereto and representing a partial instruction, and for providing to said assign block a plurality of descriptor fields corresponding to said partial instruction.

26. An apparatus as in claim 24 wherein the assign block comprises means for providing, in response to at least one prefix byte associated with an opcode byte, a consolidated prefix byte to the lookup table block, the consolidated prefix byte containing aggregated prefix information from the at least one prefix byte.

27. An apparatus as in claim 26 wherein the consolidated prefix byte providing means comprises:
means for scanning the prefetched instruction bytes beginning at a starting byte; and
means for recoding each prefix byte to include prefix information from previous prefix bytes within an instruction.

28. In a system for processing information, a method for caching CISC instructions having a variable byte-length instruction format, for delivery of said CISC instructions to an instruction decoder, comprising the steps of:
prefetching a plurality of instruction bytes from an instruction source;
predecoding each of the prefetched instruction bytes to determine at least one corresponding predecode bit for each prefetched instruction byte, the at least one predecode bit including a field for indicating instruction boundaries among the plurality of prefetched instruction bytes
storing the plurality of prefetched instruction bytes and corresponding at least one predecode bit for each prefetched instruction byte into an instruction block within an array; and
delivering a requested stream of instruction bytes and corresponding at least one predecode bit from an instruction block within the array to the instruction decoder;

wherein said predecoding step includes:
setting a particular one of said at least one predecode bit corresponding to an instruction byte to indicate that said corresponding instruction byte is a starting byte of an instruction; and
setting a particular one of said at least one predecode bit corresponding to an instruction byte to indicate that said corresponding instruction byte is an ending byte of an instruction.

29. A method as in claim 28 wherein said predecoding step includes setting a particular one of said at least one predecode bit corresponding to an instruction byte to indicate that said corresponding instruction byte is an opcode byte of an instruction.

30. A method as in claim 28 wherein the predecoding step includes the step of recoding at least one prefix byte into a consolidated prefix byte, the consolidated prefix byte containing prefix information from the at least one prefix byte.

31. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes;

first means for prefetching a plurality of instruction bytes from an instruction source;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to an instruction decoder of the processor;

wherein the at least one predecode bit includes a field for indicating a property of a respective instruction byte, the property chosen from the group consisting of:

whether a respective instruction byte, as prefetched and predecoded, represents a starting byte of an instruction;

whether a respective instruction byte, as prefetched and predecoded, represents an ending byte of an instruction;

whether a respective instruction byte, as prefetched and predecoded, represents an opcode byte of an instruction; and which instruction fields are provided by a respective instruction byte, as prefetched and predecoded.

32. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes;

first means for prefetching a plurality of instruction bytes from an instruction source;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to an instruction decoder of the processor;

wherein the second means comprises a consolidating means for consolidating prefix bytes associated with an opcode byte into a consolidated prefix byte containing prefix information from the prefix bytes; and wherein the consolidating means comprises:

means for scanning the prefetched instruction bytes beginning at a starting byte; and means for recoding each prefix byte to include prefix information from previous prefix bytes within an instruction.

33. In a super-scalar CISC processor of the type having a variable byte-length instruction format wherein each CISC instruction is mapped to a corresponding sequence of one or more internal RISC-like instructions for execution within a superscalar RISC-like core processor, an instruction cache comprising:

an array for storing a plurality of instruction blocks, each of the instruction blocks comprising a plurality of CISC instruction bytes and at least one corresponding predecode bit for each of the CISC instruction bytes;

first means for prefetching a plurality of CISC instruction bytes from an instruction source;

second means for predecoding each of the prefetched CISC instruction bytes to determine the at least one corresponding predecode bit for each prefetched CISC instruction byte, the at least one predecode bit including a field for indicating CISC instruction boundaries among the plurality of prefetched CISC instruction bytes;

third means for storing the plurality of prefetched CISC instruction bytes and corresponding at least one predecode bit for each prefetched CISC instruction byte into an instruction block within the array;

fourth means for delivering a requested stream of CISC instruction bytes and corresponding at least one predecode bit from an instruction block within the array to an instruction decoder of the processor; and fifth means for consolidating at least one prefix byte associated with an opcode byte into a consolidated prefix byte containing prefix information from each of the at least one prefix byte;

wherein the fifth means further comprises:

means for scanning the prefetched instruction bytes beginning at a starting byte; and means for recoding each prefix byte to include prefix information from previous prefix bytes within an instruction.

34. In a system for processing information, a method for caching CISC instructions having a variable byte-length instruction format, for delivery of said CISC instructions to an instruction decoder, comprising the steps of:

prefetching a plurality of instruction bytes from an instruction source;

predecoding each of the prefetched instruction bytes to determine at least one corresponding predecode bit for each prefetched instruction byte, the at least one predecode bit including a field for indicating instruction boundaries among the plurality of prefetched instruction bytes;

storing the plurality of prefetched instruction bytes and corresponding at least one predecode bit for each prefetched instruction byte into an instruction block within an array; and delivering a requested stream of instruction bytes and corresponding at least one predecode bit from an instruction block within the array to the instruction decoder;

wherein the predecoding step includes the steps of:

scanning the prefetched instruction bytes beginning at a starting byte; and recoding each prefix byte to include prefix information from previous prefix bytes within an instruction.

35. An apparatus for caching CISC instructions and for providing said instructions to an instruction decoder for dispatch into a processor core, comprising:

an array for storing a plurality of instruction blocks, each of the instruction blocks comprising a plurality of instruction bytes and at least one corresponding predecode bit for each of the instruction bytes;

an address block for providing an address to an instruction source for prefetching a plurality of instruction bytes therefrom;

a predecode block for receiving said prefetched instruction bytes, for the at least one corresponding predecode bit for each prefetched instruction byte, the at least one predecode bit including a field for indicating instruction boundaries among the plurality of prefetched instruction bytes, and for providing the plurality of prefetched instruction bytes and corresponding at least one predecode bit for each prefetched instruction byte into an instruction block within said array; and an instruction queue for storing a requested stream of instruction bytes and corresponding at least one predecode bit retrieved from an instruction block within said array, and for providing said requested stream of instruction bytes and corresponding at least one predecode bit to the instruction decoder;

wherein the predecode block comprises means for determining a consolidated prefix byte containing prefix information from at least one prefix byte corresponding to a CISC instruction;

wherein the determining means comprises:
means for scanning the prefetched instruction bytes beginning at a starting byte; and
means for recoding each prefix byte to include prefix information from previous prefix bytes.

36. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes, the at least one predecode bit indicating instruction boundaries among the plurality of prefetched instruction bytes;

wherein the at least one predecode bit indicates a property of the corresponding instruction byte, the property chosen from the group consisting of:

whether a respective instruction byte, as prefetched and predecoded, represents a starting byte of an instruction;

whether a respective instruction byte, as prefetched and predecoded, represents an ending byte of an instruction;

whether a respective instruction byte, as prefetched and predecoded, represents an opcode byte of an instruction;

which instruction fields are provided by a respective instruction byte, as prefetched and predecoded;

whether a respective instruction byte, as prefetched and predecoded, is an X86 instruction prefix byte;

whether a respective instruction byte, as prefetched and predecoded, is an X86 instruction MODR/M byte;

whether a respective instruction byte, as prefetched and predecoded, is an X86 instruction S-I-B byte;

whether a respective instruction byte, as prefetched and predecoded, is an X86 instruction DISP/IMM byte;

whether a respective instruction byte, as prefetched and predecoded, is an X86 instruction opcode byte for an X86 instruction which is mapped into 1 internal RISC-like instruction;

whether a respective instruction byte, as prefetched and predecoded, is an X86 instruction opcode byte for an X86 instruction which is mapped into a sequence of 2 internal RISC-like instructions;

whether a respective instruction byte, as prefetched and predecoded, is an X86 instruction opcode byte for an X86 instruction which is mapped into a sequence of 3 internal RISC-like instructions; and whether a respective instruction byte, as prefetched and predecoded, is an X86 instruction opcode byte for an X86 instruction which is mapped into a sequence of 4 or more internal RISC-like instructions.

37. An instruction cache for a processor of the type having a variable byte-length instruction format, comprising:

an array for storing a plurality of instruction blocks, each of the instruction blocks comprising a plurality of instruction bytes and at least one corresponding predecode bit for each of the instruction bytes;

first means for prefetching a plurality of instruction bytes from an instruction source;

second means for predecoding each of the prefetched instruction bytes to determine the at least one corresponding predecode bit for each prefetched instruction byte, the at least one predecode bit including a field for indicating instruction boundaries among the plurality of prefetched instruction bytes;

third means for storing the plurality of prefetched instruction bytes and corresponding at least one predecode bit for each prefetched instruction byte into an instruction block within the array; and fourth means for delivering a requested stream of instruction bytes and corresponding at least one predecode bit from an instruction block within the array to an instruction decoder of the processor;

wherein the second means comprises a consolidating means for consolidating prefix bytes associated with an opcode byte into a consolidated prefix byte containing prefix information from the prefix bytes; and wherein the consolidated prefix byte is provided to the third means for storing into an instruction block of the array.

38. In a super-scalar CISC processor of the type having a variable byte-length instruction format wherein each CISC instruction is mapped to a corresponding sequence of one or more internal RISC-like instructions for execution within a superscalar RISC-like core processor, an instruction cache comprising:

an array for storing a plurality of instruction blocks, each of the instruction blocks comprising a plurality of CISC instruction bytes and at least one corresponding predecode bit for each of the CISC instruction bytes;

first means for prefetching a plurality of CISC instruction bytes from an instruction source;

second means for predecoding each of the prefetched CISC instruction bytes to determine the at least one corresponding predecode bit for each prefetched CISC instruction byte, the at least one predecode bit including a field for indicating CISC instruction boundaries among the plurality of prefetched CISC instruction bytes;

third means for storing the plurality of prefetched CISC instruction bytes and corresponding at least one predecode bit for each prefetched CISC instruction byte into an instruction block within the array;

fourth means for delivering a requested stream of CISC instruction bytes and corresponding at least one predecode bit from an instruction block within the array to an instruction decoder of the processor; and fifth means for consolidating at least one prefix byte associated with an opcode byte into a consolidated prefix byte containing prefix information from each of the at least one prefix byte;

wherein the consolidated prefix byte is provided to the third means for storing into an instruction block of the array.

* * * * *

UNITED STATES PATENT AND TRADEMARK OFFICE
CERTIFICATE OF CORRECTION

PATENT NO. : 5,689,672
DATED : November 18, 1997
INVENTOR(S) : David B. Witt and Michael D. Goddard It is certified that error appears in the above-identified patent and that said Letters Patent is hereby corrected as shown below:

Col. 20, line 39: Delete "Be" and insert --$B_0$--

Signed and Sealed this

Tenth Day of November 1998

Attest:

BRUCE LEHMAN

*Attesting Officer*          *Commissioner of Patents and Trademarks*